(12) United States Patent
Ando et al.

(10) Patent No.: US 7,743,037 B2
(45) Date of Patent: Jun. 22, 2010

(54) INFORMATION PROCESSING APPARATUS AND METHOD AND PROGRAM

(75) Inventors: Hideki Ando, Kanagawa (JP); Kazuo Ido, Kanagawa (JP); Noboru Oya, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 11/243,006

(22) Filed: Oct. 4, 2005

(65) Prior Publication Data

US 2006/0112124 A1 May 25, 2006

(30) Foreign Application Priority Data

Oct. 6, 2004 (JP) ............................ 2004-294028

(51) Int. Cl.
*G06F 17/00* (2006.01)

(52) U.S. Cl. ................... 707/693; 707/687; 386/55; 386/56; 386/52

(58) Field of Classification Search ......... 707/100–101; 715/723; 348/E17.028; 386/52, 55, 56
See application file for complete search history.

(56) References Cited

U.S. PATENT DOCUMENTS

| | | | | |
|---|---|---|---|---|
| 5,852,435 A | * | 12/1998 | Vigneaux et al. | 707/E17.009 |
| 7,177,883 B2 | * | 2/2007 | Yagawa | 707/104.1 |
| 7,191,190 B2 | * | 3/2007 | Debique et al. | 707/104.1 |
| 2003/0026592 A1 | * | 2/2003 | Kawahara et al. | 386/52 |
| 2003/0142124 A1 | * | 7/2003 | Takata et al. | 345/723 |
| 2004/0223730 A1 | * | 11/2004 | Sugimoto | 386/46 |
| 2004/0267698 A1 | * | 12/2004 | Shinkai et al. | 707/1 |

FOREIGN PATENT DOCUMENTS

| | | |
|---|---|---|
| JP | 2003 259268 | 9/2003 |
| JP | 2004 110525 | 4/2004 |
| WO | WO 2004 021701 | 3/2004 |
| WO | WO 2004 064321 | 7/2004 |

* cited by examiner

*Primary Examiner*—Mohammad Ali
*Assistant Examiner*—Thuy (Tiffany) Bui
(74) *Attorney, Agent, or Firm*—Frommer Lawrence & Haug LLP; William S. Frommer; Thomas F. Presson

(57) ABSTRACT

A system and method to facilitate editing of content data. An update metadata identification block identifies metadata that is affected (or must be updated) by destructive edit processing by a material data destructive edit processing block. If the metadata is required for updating, a realtime metadata update block updates realtime metadata and a nonrealtime metadata update block updates nonrealtime metadata in correspondence with the destructive edit processing. A proxy data update block updates proxy data. A clip information file update block updates a clip information file. A clip write block records the data of each clip updated by the above-mentioned processing to an optical disc.

8 Claims, 26 Drawing Sheets

FIG. 25

| TYPE | FILE | No. | ITEM TO BE REWRITTEN | OUTLINE | CONTENTS OF VALUE |
|---|---|---|---|---|---|
| XML/BIM | INDEX | 1 | umid-clip.clip Table | REFER TO UMID OF CLIPINFO | COPY No.6 |
| | | 2 | umid-audio.clip.clip Table | REFER TO AUDIO MXF MP UMID | COPY No.14 |
| | | 3 | umid-subStream.clip.clip Table | REFER TO PROXY MXF MP UMID | COPY No.17 |
| | DISCINFO | 4 | clipId-sequential.history.discinfo | STORE REPRODUCTION POSITION | SAME AS THE END OF NORMAL REPRODUCTION MODE |
| | | 5 | ftc-sequential.history.discinfo | TAPE-LIKE REPRODUCTION ONLY | SAME AS THE END OF NORMAL REPRODUCTION MODE |
| | CLIPINFO | 6 | umid-smil | UMID OF CLIPINFO ITSELF | NEWLY CREATE |
| | | 7 | src-audio | UMID OF AUDIO | COPY No.14 |
| | | 8 | src-ref | UMID OF PROXY | COPY No.17 |
| | NRT | 9 | umidRef-TargetMaterial | REFER TO UMID OF CLIPINFO | COPY No.6 |
| | | 10 | value-LastUpdate | ESSENCE UPDATE DATA | AUDIO INSERT EXECUTION DATE |
| | | 11 | lastUpdate-NonRealTimeMeta | UPDATE DATE OF NRT ITSELF | SAME AS No.10 $LIGHT OFFSET ALLOWED) |
| | RT | 12 | UmidRef.TargetMaterial.FragmentUpdatePayload.HeadeFuu | REFER TO UMID OF CLIPINFO | COPY No.6 |
| MXF | AUDIO | 13 | LastModifiedData.PrefaceSet.HeaderMetadata | MXF FILE UPDATE DATA | SAME AS No.10 $LIGHT OFFSET ALLOWED) |
| | | 14 | PackageUID.MaterialPackageSet | MP UMID | GENERATE IN THE SAME MANNER AS NEW CLIP GENERATION BASED ON No.6 |
| | | 15 | PackageModifiedData.MaterialPackageSet | MP UPDATE DATE | SAME AS No.10 $LIGHT OFFSET ALLOWED) |
| | PROXY | 16 | LastModifiedData.PrefaceSet.HeaderMetadata | MXF FILE UPDATE DATE | SAME AS No.10 $LIGHT OFFSET ALLOWED) |
| | | 17 | PackageUID.MaterialPackageSet | MP UMID | GENERATE IN THE SAME MANNER AS NEW CLIP GENERATION BASED ON No.6 |
| | | 18 | PackageModifiedData.MaterialPackageSet | MP UPDATE DATE | SAME AS No.10 $LIGHT OFFSET ALLOWED) |

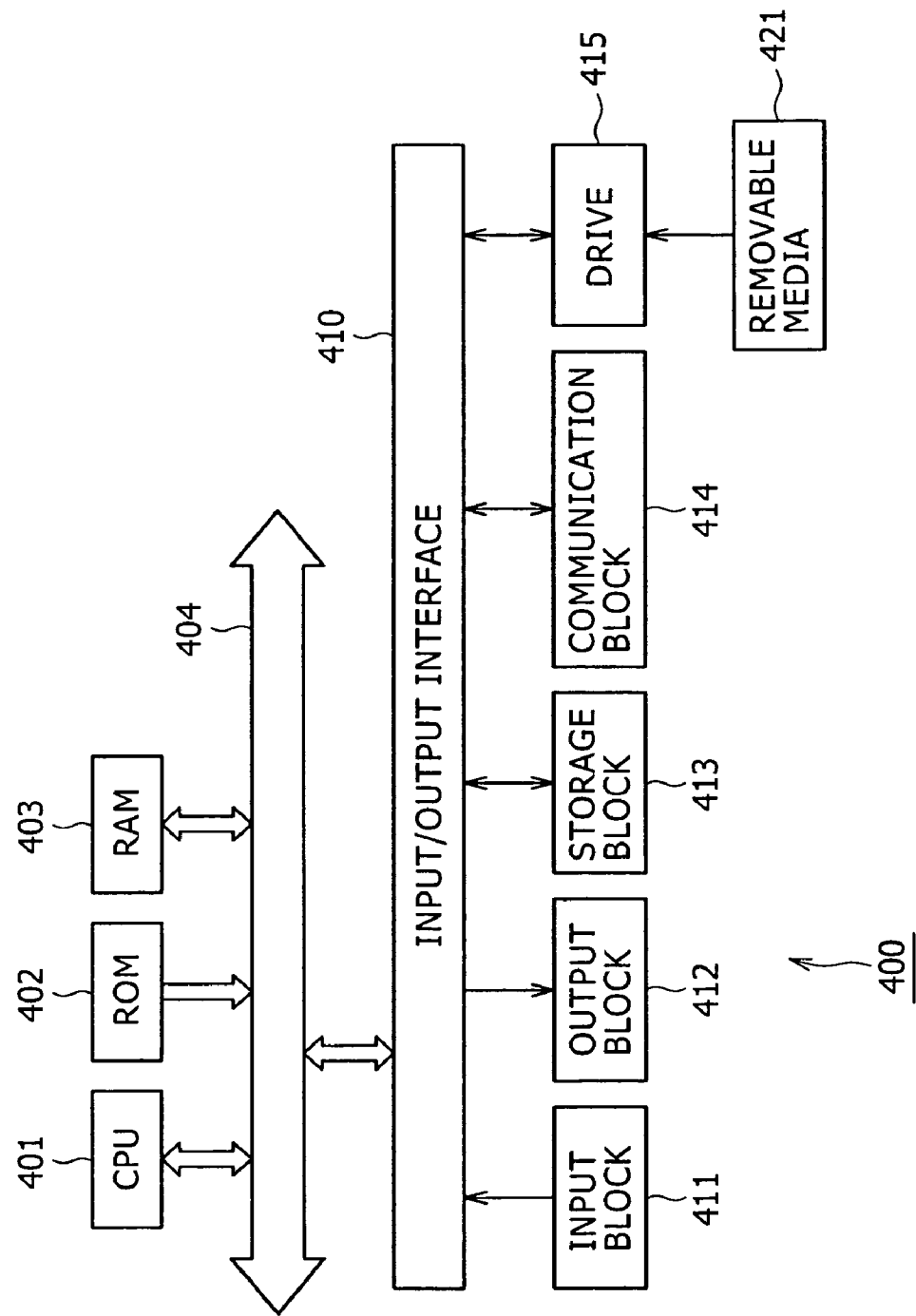

INFORMATION PROCESSING APPARATUS AND METHOD AND PROGRAM

CROSS REFERENCES TO RELATED APPLICATIONS

The present invention contains subject matter related to Japanese Patent Application JP 2004-294028 filed in the Japanese Patent Office on Oct. 6, 2004, the entire contents of which being incorporated herein by reference.

BACKGROUND OF THE INVENTION

The present invention relates to an information processing apparatus and method and a program and, more particularly, to an information processing apparatus and method and a program that correctly support the easier destructive editing of content data for example.

With related-art VTRs (Video Tape Recorders), in recording content data such as image data and audio data to a tape device, which is a recording medium, only the content data is usually recorded on the tape device. Metadata such as a time code may be attached to content data; this time code is recorded along the time axis with content data on a tape device. Therefore, if content data is edited by rewriting a part thereof for example, the metadata is updated only in the part corresponding (or accompanying) the edited part of the content data.

In contrast, a technique has been recently developed in which content data such as image data and audio data is recorded in a non-linear manner onto a random-accessible recording media such as an optical disc and a hard disc (refer to Japanese Patent Laid-Open No. 2001-29242, for example). In this technique, each piece of recorded content data is managed by a file system as a file (or a clip).

In the case of a television program made up of video and audio for example, the content data of this television program is managed as a set of a plurality of files, such as an image file, an audio file, and a metadata file. At this moment, metadata is also generated as the information for managing and reproducing these files. Namely, if content data is recorded in a non-linear manner like this, the content data is attached with many more pieces of metadata than in the case of the VTR.

Therefore, like the case of the VTR, if an editing job is executed such as rewriting content data, the contents of the metadata corresponding to the content data must also be updated so as to maintain the integrity of the files forming the content data.

With related-art technologies, in the editing of non-linearly recorded data such as above, an edit device does not update the original data to be edited, but newly generates a file that includes the information indicative of editing contents (or the information from which editing results may be derived) (this type of editing is known as non-destructive editing) (refer to Japanese Patent Laid-Open No. 2001-29242, for example).

SUMMARY OF THE INVENTION

However, in the above-mentioned non-destructive editing, a file providing editing results with the original data left unremoved is newly generated, so that, if an editing job is executed in which a part of content is overwritten with another piece of content data for example, a problem may be caused that the recording area of each recording medium is used in an unwanted manner.

Therefore, in the case of recording media such as optical disc in which content is recorded in a non-linear manner, it is also recently required, as with the VTR, to actually update the content data subject to editing (this editing is referred to as destructive editing).

However, a problem is that this destructive editing requires each user, in destructively editing image data and audio data, to execute each update job for the metadata corresponding to each piece of the data, thereby making it difficult to maintain the integrity of these data. For example, in a method in which only the metadata corresponding to the edit interval on the time axis of destructively edited image data and audio data is updated, the metadata having no time concept is not subjected to rewriting, so that little integrity may be maintained between the destructively edited image data and audio data and the metadata thereof and between a plurality of pieces of metadata. The maintenance of integrity becomes more difficult as the numbers and types of metadata corresponding to content data subject to destructive editing increase. Moreover, if the integrity of metadata is lost, the user cannot recognize the loss, which presents another problem.

It is therefore desired to provide an information processing apparatus and method and a program that are adapted, in destructive editing of content data, to also update the metadata corresponding to the content data so as to maintain the integrity of each piece of the content data and the metadata, thereby correctively and easily executing the destructive editing of the content data to ensure the operations of devices and applications based on the metadata.

In carrying out the invention and according to one aspect thereof, there is provided an information processing apparatus having material data destructive editing block for executing destructive editing in which data is actually updated for the material data; metadata identifying block for identifying metadata that is affected by the destructive editing of the material data by the material data destructive editing block; and metadata update block for updating the metadata identified by the metadata identifying block.

The above-mentioned information processing apparatus further has content data reading block for reading the content data from a recording medium; and content data writing block for writing the content data to the recording medium. The material data destructive editing block destructively edits material data of content data read from the recording medium by the content data reading block and the content data writing block writes the material data destructively edited by the material data destructive editing block and the content data including the metadata updated by the metadata update block to the recording medium.

In the above-mentioned information processing apparatus, the material data destructive editing block destructively edits the material data and updates identification information to be attached to the material data. The metadata identifying block identifies metadata having identification information for identifying metadata to be destructively edited by the material data destructive editing block. The metadata update block updates the identification information for identifying the material data to be destructively edited by the material data destructive editing block included in the metadata identified by the metadata identifying block to the identification information updated by the material data destructive editing block.

In the above-mentioned information processing apparatus, the metadata update block has a realtime metadata update block for updating realtime metadata requiring realtime nature in reproducing the metadata at the time of reproducing the material data, in the metadata to be added to the material data; and a nonrealtime metadata update block for updating nonrealtime metadata requiring no realtime nature in reproduction of the metadata at the time of reproduction of the material data, in the metadata to be added to the material data.

The above-mentioned information processing apparatus has a proxy data update block for updating proxy data that is a low-resolution data of the material data, along with the destructive editing by the material data destructive editing block.

The above-mentioned information processing apparatus has a management information update block for updating management information for managing each piece of data included in the content data, along with the destructive editing by the material data destructive editing block.

The above-mentioned information processing apparatus has an update confirming block for confirming a user whether to execute updating of the metadata by the metadata update block. Only when the user allows the updating, the metadata update block updates the metadata.

The above-mentioned information processing apparatus further has a mismatch information generation block for generating mismatch information indicative of a mismatch between the material data destructively edited and the metadata corresponding to the material data if the user does not allow the updating of the metadata as confirmed by the update confirming block.

In carrying out the invention and according to another aspect thereof, there is provided an information processing method for an information processing apparatus for processing material data forming content and content data formed by metadata to be attached to the material data. This method has the steps of executing destructive editing in which data is actually updated for the material data; identifying metadata that is affected by the destructive editing of the material data by the material data destructive editing step; and updating the metadata identified by the metadata identifying step.

In carrying out the invention and according to still another aspect thereof, there is provided a program for making a computer execute processing associated with material data forming content and content data formed by metadata added to the material data. This program has the steps of executing destructive editing in which data is actually updated for the material data; identifying metadata that is affected by the destructive editing of the material data by the material data destructive editing step; and updating the metadata identified by the metadata identifying step.

As described and according to the present invention, content data may be correctly destructively edited in an easier manner than related-art technologies. In addition, the present invention may guarantee the operations of metadata-based devices and applications.

BRIEF DESCRIPTION OF THE DRAWINGS

Other objects and aspects of the invention will become apparent from the following description of embodiments with reference to the accompanying drawings in which:

FIG. 25 is a diagram illustrating an example of a data update operation for inserting audio data; and FIG. 26 is a block diagram illustrating an exemplary configuration of a personal computer to which the present invention is applied.

DETAILED DESCRIPTION OF THE PREFERRED EMBODIMENTS

The following describes preferred embodiments of the present invention. This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

The description hereof does not denote the entire invention described herein. In other words, the existence of any invention described herein and not claimed herein will not deny the existence of any inventions that may be filed as a divisional application, emerge as a result of amendment, or added hereto in the future.

Figure 4:
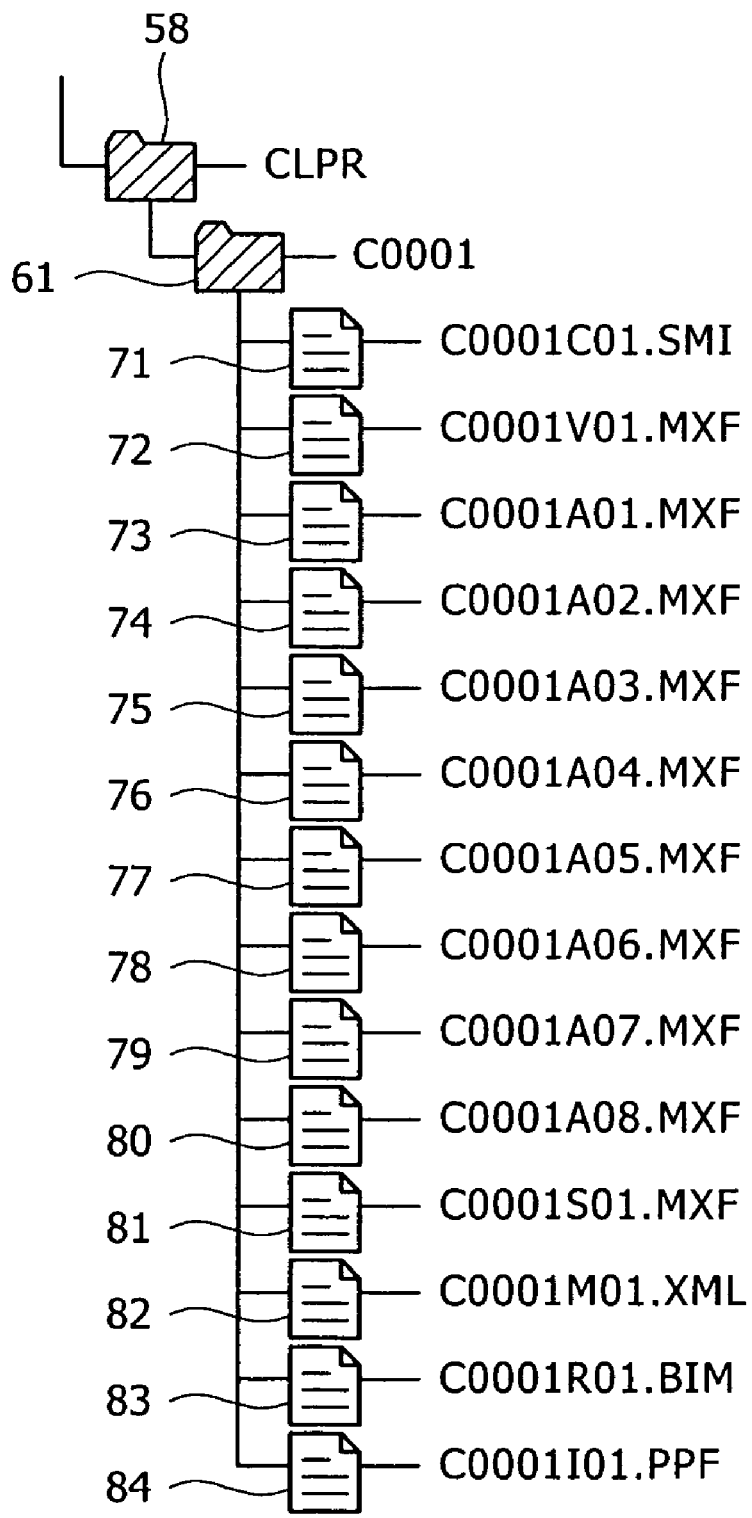
FIG. 4 is a schematic diagram illustrating an exemplary structure of another file recorded on the optical disc shown in FIG. 1.

In the present invention, an information processing apparatus (for example, an edit device shown in FIG. 1) for processing material data forming content (for example, an image data file or an audio data file shown in FIG. 4) and content data (for example, a clip directory shown in FIG. 4) made up of metadata (for example, a realtime metadata file or a nonrealtime metadata shown in FIG. 4) attached to the above-mentioned material data is provided. This information processing apparatus has material data destructive edit means (for example, a material data destructive edit block shown in FIG. 14) for executing destructive editing (for example, destructive edit processing shown in FIG. 14) for actually updating material data, metadata identification means (for example, an update metadata identification block shown in FIG. 18) for identifying metadata to be affected by the destructive editing of material data by the material data destructive edit means, and metadata update means (for example, a realtime metadata update block and nonrealtime metadata update block shown in FIG. 18) for updating the metadata identified by the metadata identification means.

The above-mentioned information processing apparatus further has content data read means (for example, a clip read block shown in FIG. 18) for reading content data from a recording medium (for example, an optical disc shown in FIG. 1) and content data write means (for example, a clip write block shown in FIG. 18) for writing content data to a recording medium. The material data destructive edit means destructively edits the material data of the content data read from a recording medium by the content data read means and the content data write means writes and content data including the material data obtained by the destructive editing by the material data destructive edit means and the metadata obtained by updating by the metadata update means to a recording medium.

The above-mentioned material data destructive edit means destructively edits material data and, at the same time, updates the identification information (for example, extended UMID shown in FIG. 8) to be attached to the material data. The metadata identification means identifies the metadata having the identification information of the material data that is destructively edited by the material data destructive edit means. The metadata update means updates the identification information of the material data to be destructively edited by the material data destructive edit means included in the metadata identified by the metadata identification means to the identification information updated by the material data destructive edit means.

In the above-mentioned information processing apparatus, the metadata update block has a realtime metadata update block (for example, realtime metadata update block shown in FIG. 18) for updating realtime metadata (for example, realtime metadata file shown in FIG. 4) requiring realtime nature in reproducing the metadata at the time of reproducing the material data, in the metadata to be added to the material data; and a nonrealtime metadata update block (for example, nonrealtime metadata update block shown in FIG. 18) for updating nonrealtime metadata (for example, nonrealtime metadata file shown in FIG. 4) requiring no realtime nature in reproduction of the metadata at the time of reproduction of the material data, in the metadata to be added to the material data.

The above-mentioned information processing apparatus has a proxy data update block (for example, proxy data update block shown in FIG. 18) for updating proxy data (for example, a low-resolution data file shown in FIG. 4) that is a low-resolution data of the material data, along with the destructive editing by the material data destructive editing block.

The above-mentioned information processing apparatus has a management information update block (for example, a clip information file update block shown in FIG. 18) for updating management information (for example, a clip information file shown in FIG. 4) for managing each piece of data included in the content data, along with the destructive editing by the material data destructive editing block.

Figure 18:
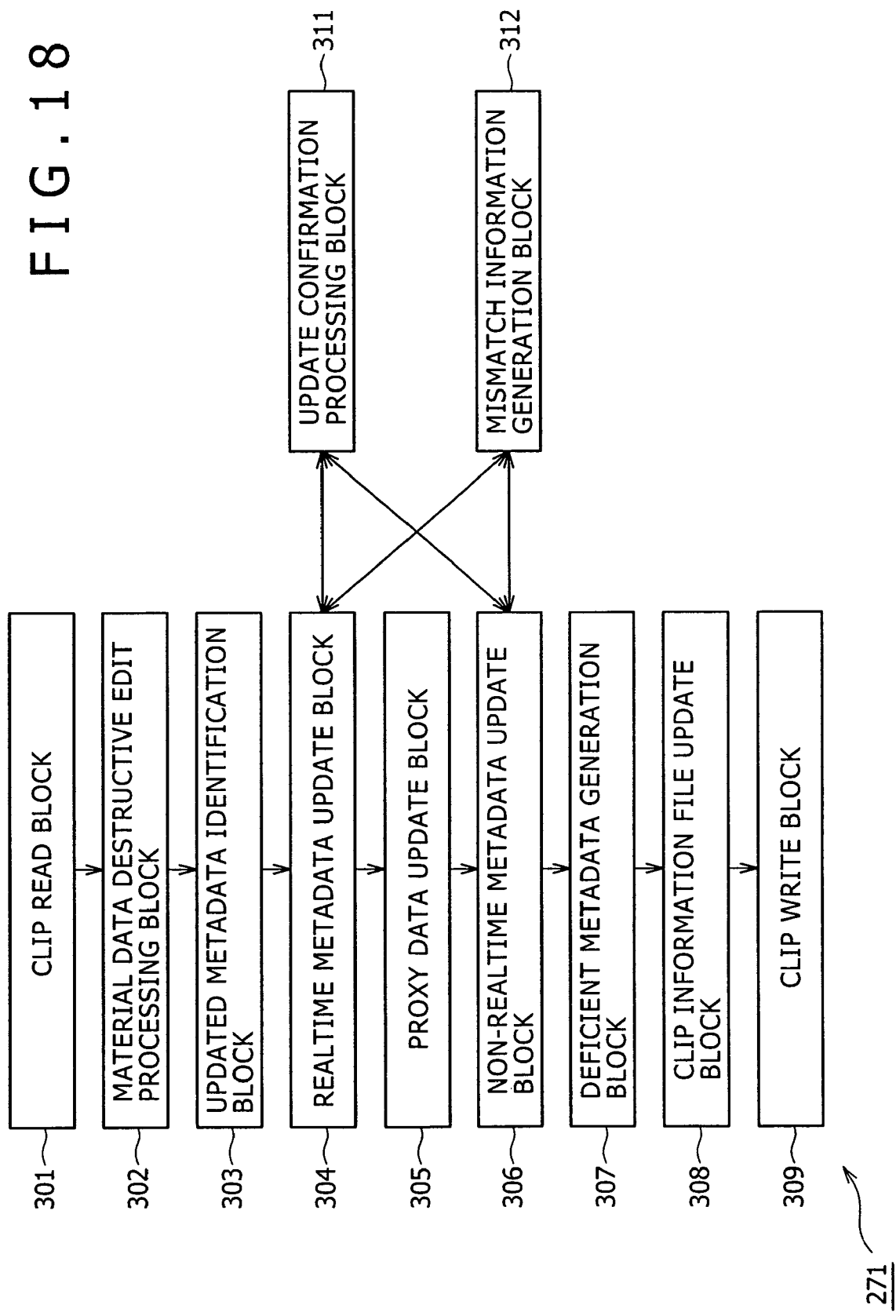
FIG. 18 is a block diagram illustrating an exemplary detail configuration of a clip destructive editing block shown in FIG. 17.

The above-mentioned information processing apparatus has an update confirming block (for example, an update confirmation processing block shown in FIG. 18) for confirming a user whether to execute updating of the metadata by the metadata update block. Only when the user allows the updating, the metadata update block updates the metadata.

The above-mentioned information processing apparatus further has a mismatch information generation block (for example, a mismatch information generation block shown in FIG. 18) for generating mismatch information indicative of a mismatch between the material data destructively edited and the metadata corresponding to the material data if the user does not allow the updating of the metadata as confirmed by the update confirming block.

In the present invention, an information processing method of an information processing apparatus (for example, an edit device shown in FIG. 1) for processing material data (for example, an image data file or an audio data file shown in FIG. 4) forming content and content data (for example, a clip directory shown in FIG. 4) made up of metadata (for example, a realtime metadata file or a nonrealtime metadata file shown in FIG. 4) attached to the above-mentioned material data is provided. This method has the steps of executing destructive editing (for example, a destructive editing processing shown in FIG. 14) (for example, step S33 shown in FIG. 21) in which data is actually updated for the material data; identifying metadata (for example, step S34 shown in FIG. 21) that is affected by the destructive editing of the material data by the material data destructive editing step; and updating the metadata identified by the metadata identifying step (for example, step S39 shown in FIG. 21 or step S55 shown in FIG. 22).

In carrying out the invention and according to still another aspect thereof, there is provided a program for making a computer execute processing associated with material data forming content (for example, an image data file or an audio data file shown in FIG. 4) and content data (for example, a clip directory shown in FIG. 4) made up of metadata (for example, a realtime metadata file or a nonrealtime metadata file shown in FIG. 4) attached to the above-mentioned material data is provided. This program has the steps of executing destructive editing (for example, step S33 shown in FIG. 21) in which data is actually updated for the material data (for example, destructive editing processing shown in FIG. 14); identifying metadata (for example, step S34 shown in FIG. 21) that is affected by the destructive editing of the material data by the material data destructive editing step; and updating the metadata identified by the metadata identifying step (for example, step S39 shown in FIG. 21 or step S55 shown in FIG. 22).

The following describes preferred embodiments of the invention with reference to accompanying drawings.

Figure 1:
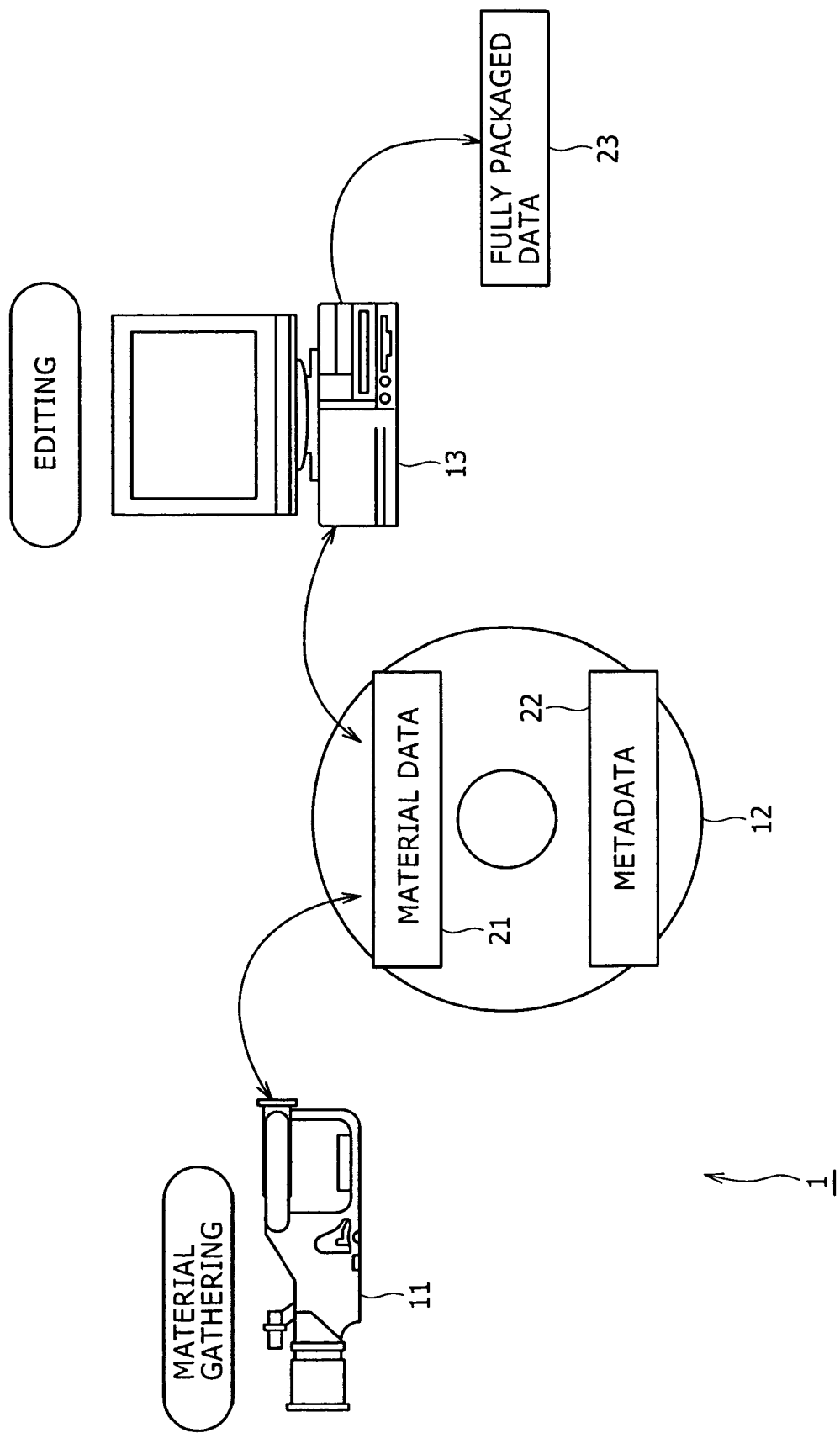
FIG. 1 is a schematic diagram illustrating an exemplary configuration of a program production system to which the present invention is applied.

Now, referring to FIG. 1, there is shown an exemplary configuration of a program production system practiced as one embodiment of the invention.

In FIG. 1, reference numeral 1 denotes a system for producing programs (or content) that are broadcast by television for example. The program production system 1 has a camcorder 11 and an edit device 13.

The camcorder 11 takes a picture of a subject and records material data 21 such as taken image data and audio data and metadata 22 thereof to an optical disc 12, which is a recording medium. Thus, the camcorder 11 is used for material gathering work, one of program production processes.

The edit device 13 edits the material data 21 and the metadata 22 recorded on the optical disc 12, in which two or more pieces of data are linked together, unwanted portions are deleted, audio data is inserted, character data such as subtitles is inserted, and a fully packaged data 23 that is data completed as content is generated, for example. Thus, the edit device 13 is used for editing work, one of program production processes.

The optical disc 12 is a mass storage recording medium, such as CD (Compact Disc) and DVD (Digital Versatile Disc), and is used to record material data 21 and metadata 22 for example. The optical disc 12 is a random-accessible, thereby managing each item of data as a file in a time-independent manner (or in a nonlinear manner). Therefore, for example, the edit device 13 is made accessible to any file recorded on the optical disc 12 regardless of the recording sequence thereof.

Namely, in the program production system 1, the camcorder 11 and the edit device 13 pass the material data 21 and the metadata 22 to each other via the random accessible optical disc 12.

Figure 2:
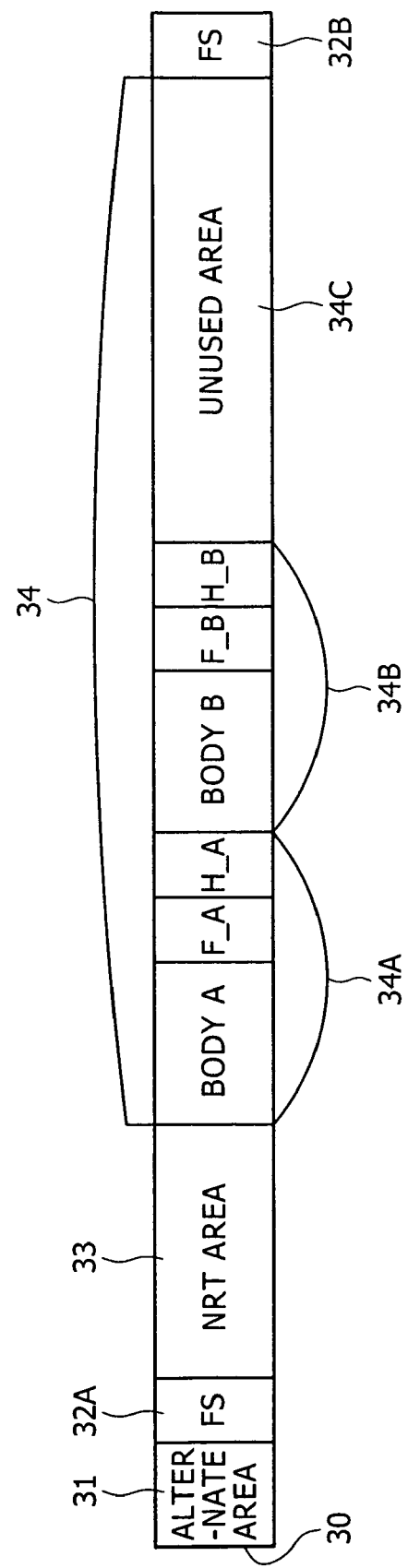
FIG. 2 is a schematic diagram illustrating an exemplary configuration of a recording area of an optical disc shown in FIG. 1.

Referring to FIG. 2, there is shown an exemplary configuration of record areas of the optical disc 12 shown in FIG. 1.

In FIG. 2, a record area 30 of the optical disc 12 has an alternate area 31, file systems 32A and 32B, a nonrealtime metadata area (NRT (NonRealTime) area) 33 and a clip area 34.

The alternate area 31 provides a record area for use in an alternate manner if another record area is damaged by scratch, smear, defective manufacture, or expired service life for example to become inaccessible. The file systems 32A and 32B stores management information for managing the data stored in the NRT area 33 and the clip area 34 as files.

The NRT area 33 stores NonRealTime metadata (NRT) that is the metadata corresponding to a clip to be recorded in the clip area 34. A clip is a set of data that form one piece of content. For example, a clip is formed of image data, audio data, realtime metadata (RT) made up of the metadata corresponding to each frame of image data, and proxy data that is low-resolution data of image data and audio data, for example.

A clip is a unit indicative of one session of image processing from starting of image taking by the operator to the end thereof. Namely, one clip image signal is normally made up of an image signal composed of a plurality of frames. It should be noted that a clip is not only indicative of one session of image processing, but also indicative of a time from the start of image taking in that image processing to the end thereof. A clip is also indicative of the length and amount of the image data obtained by one session of image processing and indicative of the image data itself. In addition, a clip is indicative of the length and amount of the various data obtained by (or associated with) one session of image processing and indicative of an aggregate itself of these various data. To be more specific, the data included in each clip includes material data such as image data and audio data, various metadata associated with other material data, proxy data that is low-resolution data of material data, and play list data for controlling the reproduction of material data, for example.

For example, in the material gathering work shown in FIG. 1, a data group obtained by one session of imaging (from start to end of imaging) to be executed by the camcorder 11 is one clip. It should be noted that, if plural pieces of image data are linked together by an editing job in the edit device 13, one piece of image data as a result of the editing job (and each piece of data corresponding to this image data) provides one clip.

The metadata to be attached to the material data of a clip includes realtime metadata composed of the data of contents that require being realtime in read processing and nonrealtime metadata composed of the data of contents that do not require being realtime in read processing.

Realtime metadata (RT) includes LTC (Linear Time Code) for identifying the position of each image signal frame by use of particular time information such as hour, minute and second, FTC (File Time Code) that is the number of each frame and relative positional information from the start frame of each file, UB (User Bit) indicative of the signal characteristic of the image signal of that frame, UMID (Unique Material Identifier) indicative of each frame, GPS (Global Positioning System) information indicative of the position at which an image was taken by the video camera, an essence marker indicative of information associated with the contents of essence data such as image signal and audio signal, ARIB (Association of Radio Industries and Businesses) metadata, and setting/control information about the video camera by which the image was taken, for example. It should be noted that the ARIB metadata is the metadata for communication interface such as SDI (Serial Digital Interface) standardized by ARIB, an standardization organization. The video camera setting/control information includes IRIS control value, white balance/black balance mode, and lens information associated with lens zooming and focusing.

Nonrealtime (NRT) metadata is the metadata for an entire clip. NRT metadata includes a conversion table indicative of the correlation between LTCs corresponding to frames and frame numbers (FTCs), UMID and GPS information, and other information, for example. It should be noted that a frame is a unit of image signals, or the image data for one screen of image (or various types of data corresponding to that image data). A clip is a unit indicative of one session of image processing, from starting of image taking by the operator to ending thereof. Namely, one clip of image signal usually consists of plural frames of image signal.

The above-mentioned realtime metadata and nonrealtime metadata may be attached to any unit of image data. In what follows, an example will be described in which realtime metadata is attached to image data, frame by frame, and nonrealtime metadata is attached to image data, clip by clip. Namely, in the following example, it is supposed that realtime metadata be frame metadata that is attached to image signal, frame by frame, and include the data corresponding to the attached frame. Also, it is supposed that nonrealtime metadata be clip metadata that is attached to image signal, clip by clip, and include the data corresponding to an entire attached clip.

Normally, image data is arranged as a file, clip by clip, to be managed by a file system. In such a case, nonrealtime metadata may be metadata for each file including image data.

It should be noted that realtime metadata and nonrealtime metadata may also include other data than mentioned above. Realtime metadata and nonrealtime metadata may also include the data of same contents. Each piece of data as the above-mentioned realtime metadata may be nonrealtime metadata or, inversely, each piece of data mentioned above as nonrealtime metadata may be realtime metadata. For example, essence markers, ARIB metadata or video camera setting/control information for example may be nonrealtime metadata. UMID and GPS information may be included in realtime metadata or in both realtime metadata and nonrealtime metadata.

As shown in FIG. 2, the clip area 34 sequentially records clip data, like clip 34A, clip 34B and so on, for example. In FIG. 2, an area not yet recorded with a clip of the clip area 34 is an unused area 34C. It should be noted that the clip 34A is made up of body A including the image data and audio data belonging to the clip 34A, footer information F_A, and header information H_A. Likewise, the clip 34B is made up of body B including the image data and audio data belonging to clip 34B, footer information F_B, and header information H_B.

Figure 3:
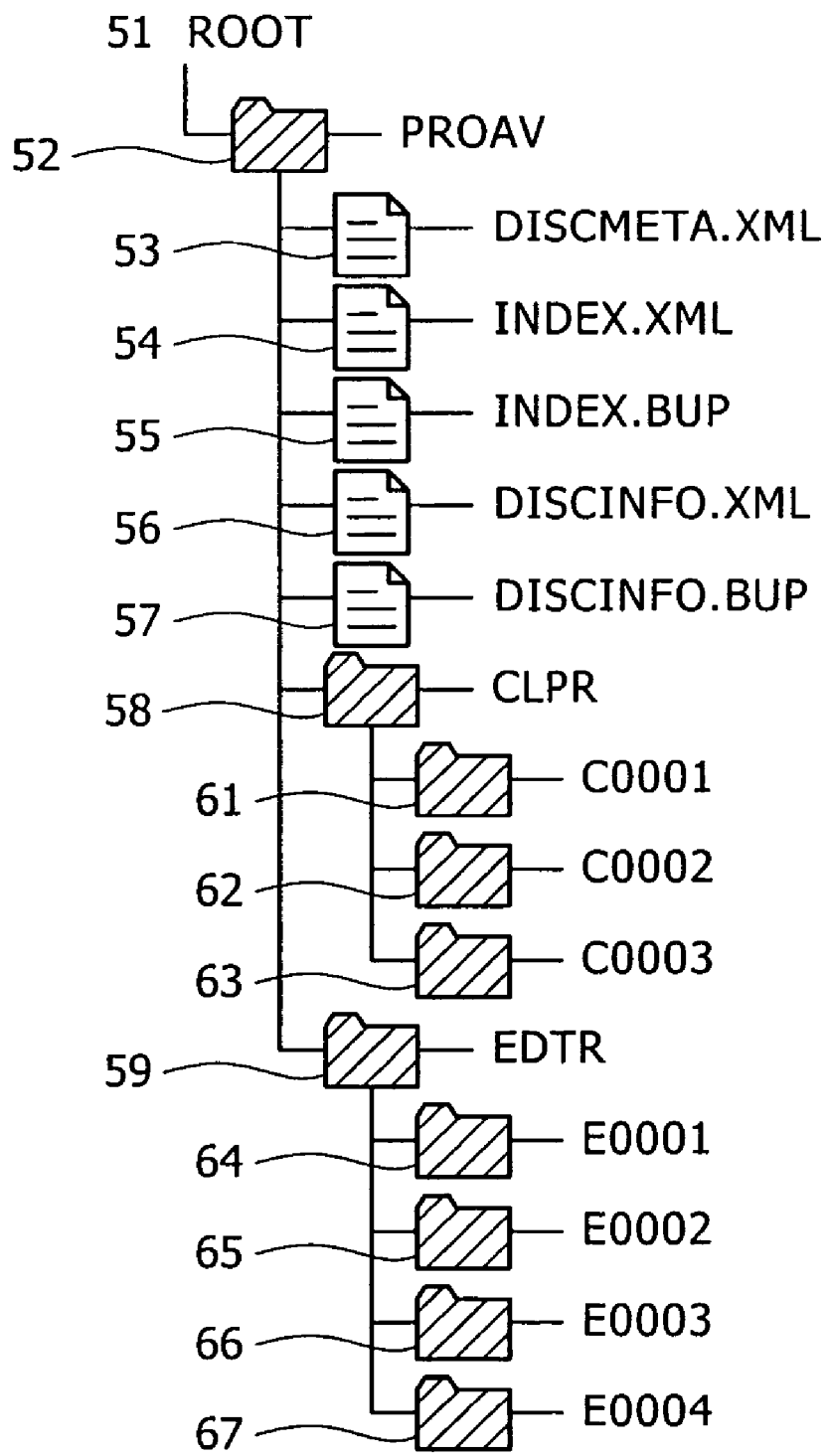
FIG. 3 is a schematic diagram illustrating an exemplary structure of a file recorded to the optical disc shown in FIG. 1.
Figure 5:
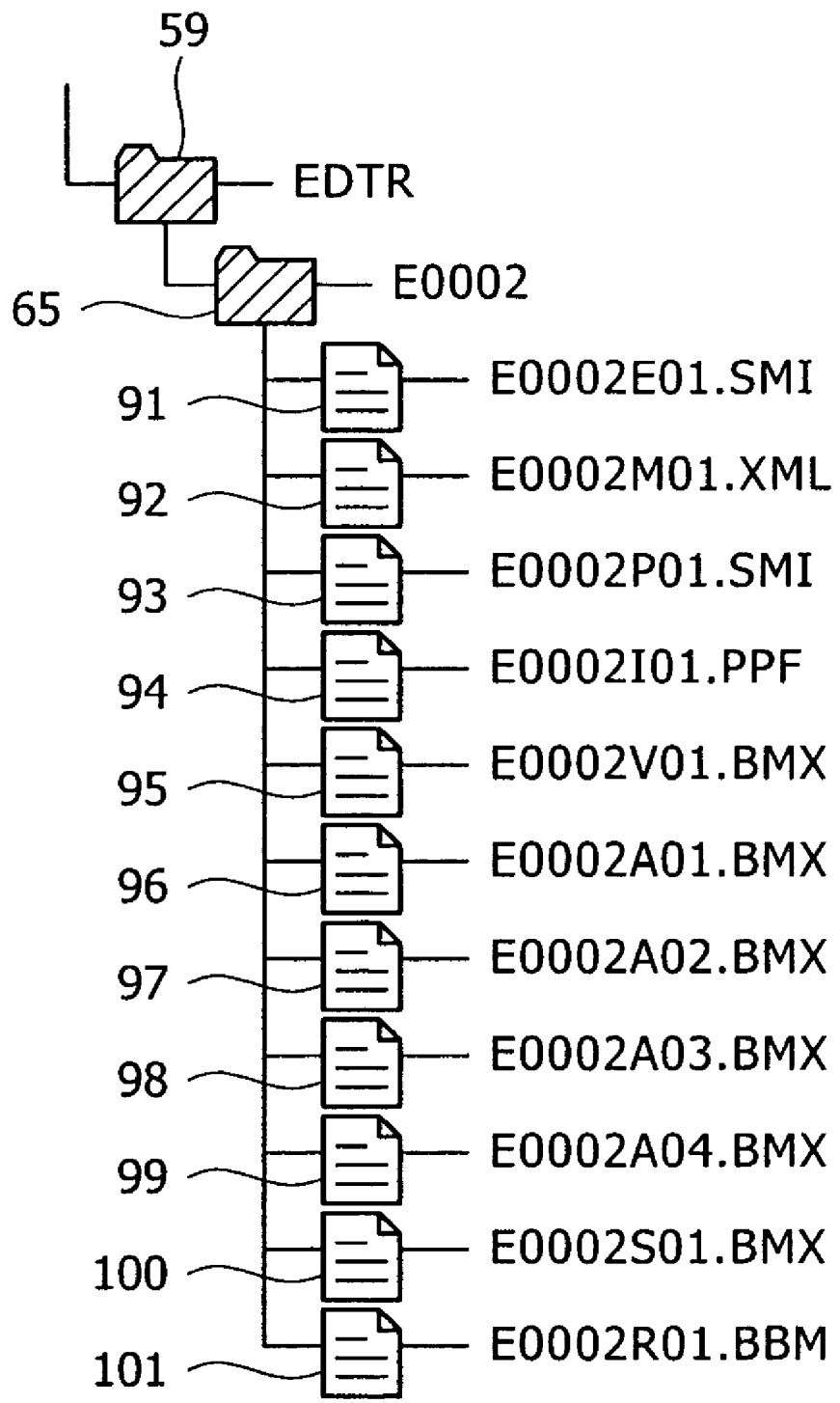
FIG. 5 is a schematic diagram illustrating an exemplary structure of still another file recorded on the optical disc shown in FIG. 1.

In the optical disc 12, each piece of data is managed as a file by means of the management information of the file systems 32A and 32B as shown in FIGS. 3 through 5.

Any file system may be used for the management of the data recorded to the optical disc 12. For example, UDF (Universal Disc Format) or ISO9660 (International Organization for Standardization 9660) may be used. If a magnetic disc such as a hard disc is used instead of the optical disc 12, a file system such as FAT (File Allocation Tables), NTFS (New Technology File System), HFS (Hierarchical File System), or UFS (Unix™ File System) may be used. Alternatively, a propriety file system may be used.

In each of the above-mentioned file systems, the data recorded to the optical disc 12 is managed by a directory structure and files as shown in FIG. 3.

Referring to FIG. 3, a root directory (ROOT) 51 has a PROAV directory 52 in which the information associated with image data and audio data and an edit list indicative of material data edit results are arranged in lower directories. It should be noted that the root directory 51 also has configuration table data and so on, not shown.

The PROAV directory 52 has a disc metafile (DISC-META.XML) 53, an index file (INDEX.XML) 54 including management information for managing all clips and edit lists recorded to the optical disc 12, a copy index file (INDEX-.BUP) 55, a disc information file (DSICINFO.XML) 56, a copy disc information file (DISCINFO.XML) 57, a clip root directory (CLPR) 58 in which clip data is arranged in lower directories, and an edit list root directory (EDTR) 59 in which edit list data is arranged in lower directories.

In the clip root directory 58, the data of clips recorded to the optical disc 12 is managed in different directories for different clips; for example, in the example shown in FIG. 3, the data of three clips are managed in three directories of a clip directory (C0001) 61, a clip directory (C0002) 62, and clip directory (C0003) 63. Namely, The data of the first clip recorded to the optical disc 12 are managed as files of a lower directory of the clip directory 61, the data of the second clip recorded to the optical disc 12 are managed as files of a lower directory of the clip directory 62, and the data of the third clip recorded to the optical disc 12 are managed as files of a lower directory of the clip directory 63.

In the edit list root directory 59, the edit lists recorded to the optical disc 12 are managed in different directories for different edit processing operations; for example, in the example shown in FIG. 3, four edit lists are managed in four directories of an edit list directory (E0001) 64, an edit list directory (E0002) 65, an edit list directory (E0003) 66, and an edit list-directory (E0004) 67. Namely, the edit lists indicative of the first edit results of clips recorded to the optical disc 12 are managed as files of a lower directory of the edit list directory 64, the edit lists indicative of the second edit results are managed as files of lower directory of the edit list directory 65, the edit lists indicative of the third edit results are managed as files of lower directory of the edit list directory 66, and the edit lists indicative of the second edit results are managed as files of lower directory of the edit list directory 67.

The data of the clip first recorded to the optical disc 12 are arranged and managed as files as shown in FIG. 4 in a lower directory of the clip directory 61 arranged in the clip root directory 58.

In the example of FIG. 4, the clip directory 61 has a clip information file (C0001C01.SMI) 71 for managing this clip, an image data file (C0001V01.MXF) 72 including the image data of this file, eight audio data files (C0001A01.MXF through C0001A08.MXF) 73 through 80 including audio data of the channels of this clip, a proxy data file (C0001S01.MXF) 81 including low-resolution data corresponding to the image data of this clip, a nonrealtime metadata file (C0001M01.XML) 82 including the metadata corresponding to the entire clip and nonrealtime metadata that does not require realtime nature such as a conversion table relating LTC (Linear Time Code) with frame number for example, a realtime metadata file (C0001R01.BIM) 83 including the metadata corresponding to the frames of image data of this clip and the realtime metadata that requires realtime nature such as LTC for example, and a picture pointer file (C0001I01.PPF) 84 including a frame structure (for example, the information associated with the data compression algorithm for each picture in MPEG (Moving Picture Experts Group) and the information such as an offset address from the head of file) of the image data file 72.

In the example shown in FIG. 4, the image data, proxy data, and the realtime metadata, which require realtime nature at the time of reproduction, are each manages as one file, thereby preventing the read time from increasing.

The audio data also requires realtime nature and is provided for eight channels in order to cope with the audio multi-channel such as the 7.1-channel scheme. These eight channels of audio data are each managed as one file. However, the audio data may also be managed as other than eight files; for example, the number of audio data files may be seven or less or nine or more.

Likewise, the image data, the proxy data, and the realtime metadata may also be managed as two or more files as required.

In the example shown in FIG. 4, the nonrealtime metadata that does not require realtime nature is managed as a file that is different from the realtime metadata that require realtime nature. This prevents unnecessary metadata from being read during the normal reproduction of image data for example, thereby reducing the processing time necessary for the reproduction processing and mitigating the load of the processing.

It should be noted that the nonrealtime metadata file 82 is written in XML (extensible Markup Language) in order to provide universality. The realtime metadata file 83 is a BIM file obtained by compiling the XML file in order to reduce the processing time of reproduction processing and mitigating the load of the processing.

An exemplary file configuration of the clip directory 61 shown in FIG. 4 may be applied in all clip directories corresponding to the clips recorded to the optical disc 12. Namely, the exemplary file configuration shown in FIG. 4 may be applied in other clip directories 62 and 63 shown in FIG. 3, so that the description of this exemplary file configuration will be skipped.

The following describes an exemplary file configuration in lower directories of the edit list root directory 59 shown in FIG. 3. The lower directories of the edit list directory 65 arranged in the above-mentioned edit list root directory 59 have edit list data that is the information associated with the results of the second editing of the data of clips recorded to the optical disc 12, these pieces of edit list data being managed as files as shown in FIG. 5.

In the example shown in FIG. 5, the edit list directory 65 has an edit list file (E0002E01.SMI) 91 that is a file for managing this edit result (or edit list), a nonrealtime metadata file for edit list (E0002M01.XML) 92 that is a file including the nonrealtime metadata corresponding to the entire edited material data (or the portion extracted as edited data from the material data of all clips used for the editing) or the nonrealtime metadata newly generated on the basis of the former nonrealtime metadata, a play list file (E0002P01.SMI) 93, a picture pointer file for play list (C0002I01.PPF) 94, an image data file for play list (E0002V01.BMX) 95, an audio data files for play list (E0002A01.BMX through E0002A04.BMX) 96 through 99, a proxy data file for play list (E0002S01.BMX) 100, and a realtime metadata file for play list (E0002R01.BBM) 101.

Referring to FIG. 5, nonrealtime metadata that does not require realtime nature is managed as files different from realtime metadata that requires realtime nature. This prevents unnecessary metadata from being read during the reproduction of image data for example (or during the reproduction of edit results) by use of a reproduction procedure (or a play list), thereby reducing the processing time necessary for the reproduction processing and mitigating the load of the processing.

The nonrealtime metadata file for edit list 92 is a file that includes the new nonrealtime metadata generated on the basis of the nonrealtime metadata (the nonrealtime metadata files in lower directories of the clip root directory 58) of the clips used for the editing on the basis of the results of the editing. For example, when an editing operation has been executed, the portion corresponding to the edited material data is extracted from the nonrealtime metadata included in the nonrealtime metadata file 82 shown in FIG. 4. The extracted portion is then used to reconstruct new nonrealtime metadata with the edited material data being one clip. The reconstructed nonrealtime metadata is managed as a nonrealtime metadata file for edit list. Namely, the edited material data is added with the new nonrealtime metadata with the edited material data being one clip and this nonrealtime metadata is managed as one nonrealtime metadata file for edit list. Therefore, this nonrealtime metadata file for edit list is generated every time an editing operation is executed.

It should be noted that this nonrealtime metadata file for edit list 92 is written in XML in order to provide universality.

Likewise, the image data, the proxy data, and the realtime metadata may also be managed as two or more files as required. The number of files corresponding to audio data may be three or less or five or more.

The exemplary configuration of the edit list directory 65 shown in FIG. 5 is applicable to all edit lists (or edit results). Namely, the exemplary file configuration shown in FIG. 5 is also applicable to other edit list directories 64, 66, and 67 shown in FIG. 3, so that the description thereof will be skipped.

Figure 6:
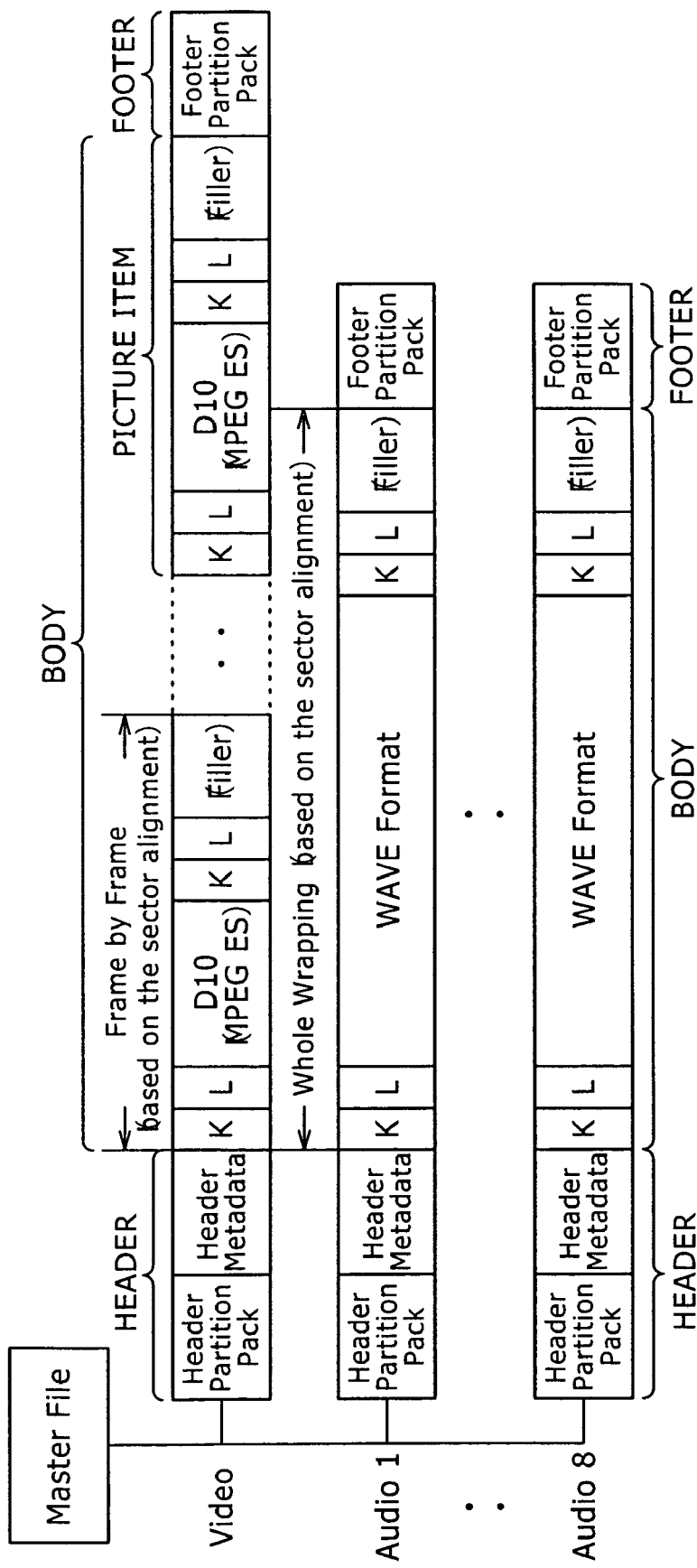
FIG. 6 is a schematic diagram illustrating an exemplary configuration of an AV independent format.

As shown in FIG. 4, image data and audio data are independently managed as an image data file 72 and audio data files 73 through 80 such that these pieces of data may be separately edited (AV (Audio Visual) independent editing) with ease. FIG. 6 shows exemplary-configurations of the formats (AV independent formats) of the image data file 72 and the audio data files 73 through 80 thus managed.

The AV independent format provides files in which video data and audio data are collectively arranged.

It should be noted that picture items are collectively arranged in an integral multiple of the sector length of the optical disc 12 in the body of the video file of the AV independent format, so that the size of the entire body is also an integral multiple of the sector length of the optical disc 12. Namely, the body of each video file of the AV independent format has a size with sector alignment provided.

In MXF, an index table is optional and therefore the video file shown in FIG. 6 (and the audio file to be described later) employs no index table.

In the AV independent format, audio data (or voice data) of WAVE format is arranged in KLV (Key Length Value) structure in the body of the file for each channel and a header and a footer are attached to the body to configure an audio file.

Namely, in the AV independent format, eight channels of audio data are each independently formed into an audio file. With an audio file of each channel, the audio data of that channel is put in the WAVE format, which is then collectively put in KLV structure to be arranged in the body, to which a header and a footer are attached.

It should be noted that the audio data of WAVE format of a given channel are put in KLV structure to be arranged in the body of each audio file of AV independent format. The size of this audio data in its entirety does not always become an integral multiple of the sector length of the optical disc 12. Therefore, in order to provide sector alignment, a filler of KLV structure having a size enough for providing sector alignment is arranged after the audio data of KLV structure in the body of each audio file of AV independent format.

As described above, with the AV independent format, video data are collectively arranged in a video file and audio data of all channels are collectively arranged in the audio files corresponding to these channels. This configuration facilitates editing such as the AV independent editing in which video data and audio data are separately edited.

It should be noted that image data, audio data, proxy data, and realtime metadata are divided by predetermined time intervals to be recorded as annual-ring data so as to easily maintain realtime nature at the time of reproduction when these data are recorded to the optical disc 12.

Namely, the annual-ring data made up of corresponding portions of all data is recorded to the optical disc 12 in a continuous manner.

Figure 7:
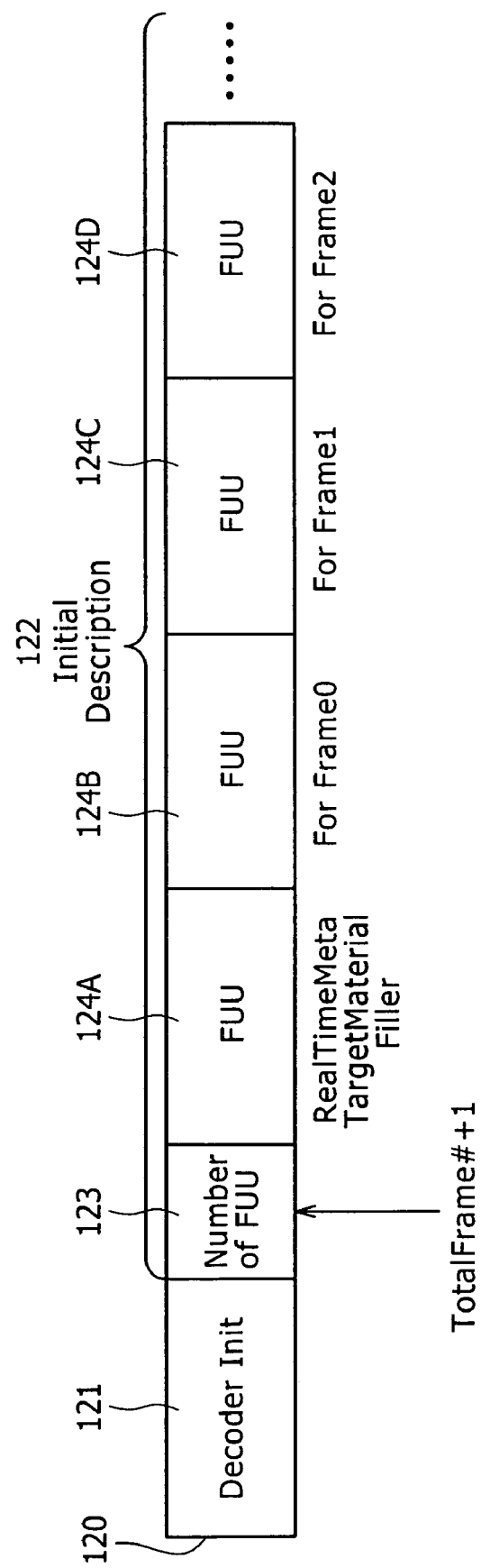
FIG. 7 is a schematic diagram illustrating an exemplary configuration of a realtime metadata file.

FIG. 7 is a schematic diagram illustrating an exemplary configuration of the realtime metadata file 83 (C001R01.BIM) shown in FIG. 4.

As shown in FIG. 7, a realtime metadata file 120 is made up of decode information (DecoderInit) 121 for storing reference information for reproduction and initial description 122 that is a metadata body.

Realtime metadata is metadata to be attached to each frame of image data. Namely, the realtime metadata file 120 is configured as a set of metadata (frame units (FUU Fragment Update Unit)) for frames. The initial description 122 has frame unit count information (or the number of FUUs) 123 indicative of the number of frame units, followed by frame units for frames, such as FUU 124A, FUU 124B, FUU 124C, FUU 124D, and so on. It should be noted that the start FUU 124A is indicative of the start information and is configured as a realtime metadata target material filler. Following this FUU 124A, FUU 124B for the frame having frame number 0 that is the start frame of image data is arranged, followed by FUU 124C corresponding to the frame having frame number 1, FUU 124D corresponding to the frame having frame number 2, and so on. It should be noted that the value of the frame unit count information 123 is "the number of frames of image data +1" on the basis of the above-mentioned configuration.

Each frame unit is written with the LTC of the corresponding frame, the UMID of the corresponding frame, and a KLV packet made up of information such as the essence marker for example of the corresponding frame.

Figure 8:
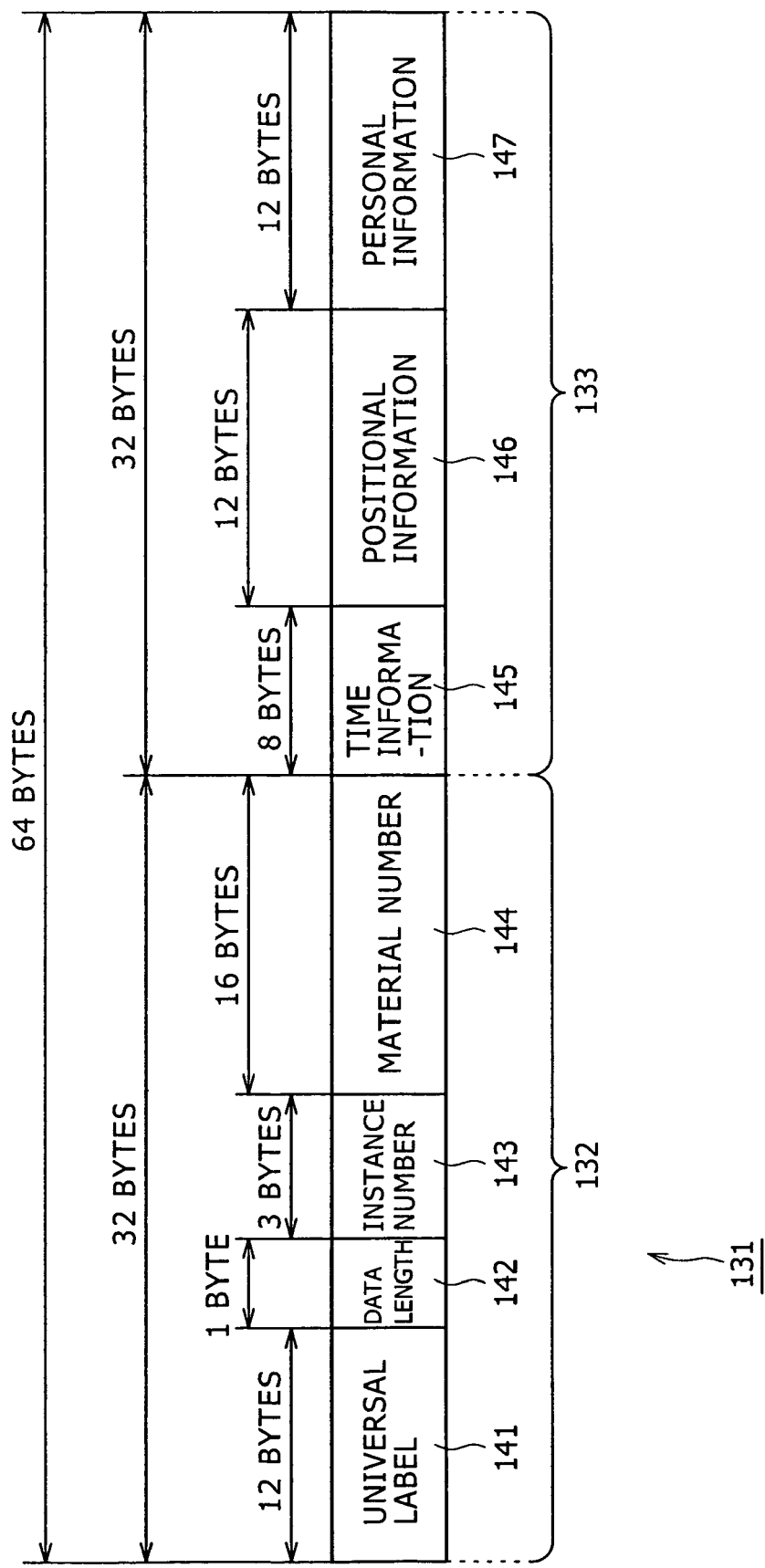
FIG. 8 is a diagram illustrating an exemplary basic configuration of UMID.

FIG. 8 shows a basic exemplary configuration of the UMID. In FIG. 8, an extended UMID 131 is 64-byte identification information that globally uniquely identifies all materials such as image data, audio data, and metadata. The UMID has a basic UMID 132 that includes minimum necessary basic information and the extended UMID 131 obtained by attaching a source pack 133 that is extended information to the basic UMID 132.

Namely, the 64-byte extended UMID 131 is made up of the 32-byte basic UMID 132 and the 32-byte source pack 133. The basic UMID 132 is made up of a 12-byte universal label 141, a 1-byte data length 142, a 3-byte instance number 143, and a 16-byte material number 144.

The universal label 141 stores universal label information indicative that this ID is the UMID defined by SMPTE (Society of Motion Picture and Television Engineers). The universal label 141 is made up of a 10-byte fixed header indicative of UMID, 1-byte information indicative of the type of a target AV material to which this UMID is allocated, and 1-byte information indicative of a method of generating each field value of UMID. The data length 142 stores information indicative of the data length of this UMID. Namely, the value of the data length 142 is 32 bytes in the case of the basic UMID and 64 bytes in the case of extended UMID. The instance number 143 is a field for storing information indicative of an instance. This field stores identification information for identifying a material with the value of the material number 144 being the same. For example, if the same data is copied several times, the value of the instance number 143 may be changed depending on the copy method used for identification, thereby identifying the copied data. Namely, this instance number 143 allows the UMID to be used for the identification other than the globally unique identification of material. The material number 144 is a field for storing identification information for globally uniquely identifying a material and is made up of a time snap that is time information, globally unique device identification information, and a random number.

The source pack 133 is extended information for the basic UMID 132 and made up of 8-byte time information 145, 12-byte positional information 146, and 12-byte personal information 147.

The time information 145, the positional information 146, and the personal information 147 are fields for storing the information associated with the generation of materials to which the UMID is allocated. Namely, a time of generation is stored in the time information 145, GPS (Global Positioning System) information indicative of the position at which the material has been generated is stored in the positional information 146, and the information about a person who has generated the material is stored in the personal information 147.

Figure 9:
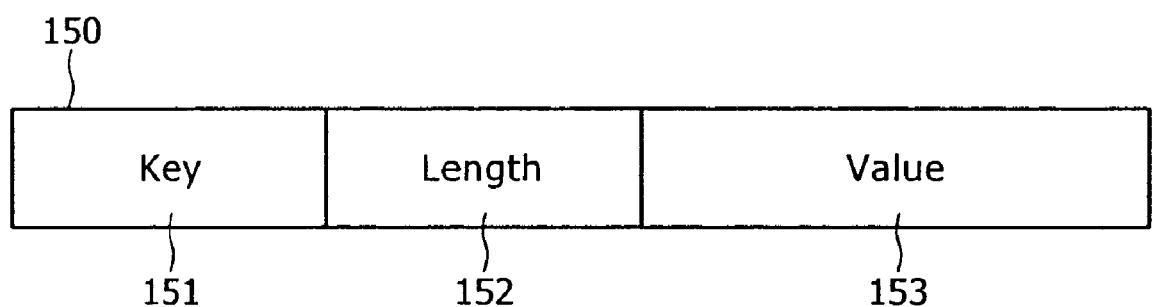
FIG. 9 is a diagram illustrating an exemplary basic configuration of a KLV packet.

FIG. 9 shows an exemplary basic configuration of a KLV packet. In FIG. 9, a KLV packet 150 is KLV-coded data composed of key data 151, length data 152, and value data 153. This format is compliant with SMPTE 335M/RP214.

The key data 151 of the KLV packet 150 is an identifier indicative of a KLV-coded data item. For this identifier, an identifier corresponding to each data item defined in an SMTPE metadata dictionary is used. The length data 152 of the KLV packet 150 is indicative of the length of the value data 153 in bytes. The value data 153 of the KLV packet 150 is made up of a data body such as text data like an XML (extensbile Markup Language) for example. Namely, the KLV packet 150 is the data of a data item indicated by the key data 151, the data of a data item indicated by the length data 152, and the data obtained by encoding the data indicated by the value data 153.

Each piece of data included in realtime metadata is composed of above-mentioned each type of data that is a KLV packet having the above-mentioned data structure. Realtime metadata composed of plural pieces of data is largely divided into an essential portion and an optional portion depending on the contents of each type of data. The essential portion is the data included in the realtime metadata corresponding to all frames and composed of various kinds of data such as LTC, user bit, UMID, essence marker, and other KLV data. The optional portion is composed of the data included in realtime metadata as required. The data included in the optional portion includes ARIB metadata and video camera setting/control information, for example.

It should be noted the lengths of the essential portion and the optional portion are predetermined fixed lengths. Also, realtime metadata is required to have realtime nature so as to cope with the data transfer through a synchronous communication interface such as SDI, so that the essential portion (and the optional portion) is made up of one file of BIM (BInary Format for MPEG-7), thereby allowing high-speed access to the optical disc 12.

The following describes the index file 54 shown in FIG. 3. An index file is used to manage the information about files recorded to the optical disc 12. For the clips stored below a clip root directory are described as a clip table. In the clip table, clips to be managed are specified by use of UMID. Each piece of data forming each clip is also specified by use of UMID. The index file also manages edit lists in the same manner, specifying edit lists to be managed by use of UMID.

The following describes information included in the nonrealtime metadata file 82 shown in FIG. 4. The nonrealtime metadata file 82 provides an additional information for that clip, about the image data files and audio data files stored in the same clip directory as the nonrealtime metadata file 82, this additional information requiring no realtime nature.

The nonrealtime metadata file 82 includes the UMID of a clip (or a clip information file 71) to which the nonrealtime metadata file 82 is added and an LTC change point table (LtcChangeTable) that is a table information about frames in which LTC changes are nonlinear. The nonrealtime metadata file 82 also includes a typical user bit (TypicalUbit) composed of "reel number" that is information for identifying a recording medium in which each clip is recorded. "Reel number" is information for use in facilitating the management of clips, frequently used in VTR.

Further, the nonrealtime metadata file 82 includes a basic UMID change point table (BodyUmidBasicChangeTable) that is a table information about frames in which values of basic UMID (Basic) that is the basic information included in UMID (BodyUmid) of each frame of image data change, a time information change point table (BodyUmidWhenChangeTable) that is table information about frames in which values of time information (When) of UMID (BodyUmid) of each frame of image data change, a positional information change point table (BodyUmidWhereChangeTable) that is table information about frames in which values of positional information (Where) of UMID of each frame of image data change, and a personal information change point table (BodyUmidWhoChangeTalbe) that is table information about frames in which values of personal information (Who) of UMID (BodyUmid) of each frame of image data change.

In addition, the nonrealtime metadata file 82 includes a KLV packet table (KlvPacketTable) that is table information about frames attached with KLV packets. Besides, the nonrealtime metadata file 82 includes the information about the video format of image data, the information about the audio format of audio data, the information about the hardware and software used for data recording and editing, the information about user, the title information about clips to which the nonrealtime metadata file 82 corresponds, and given memo information (or description).

Figure 10:
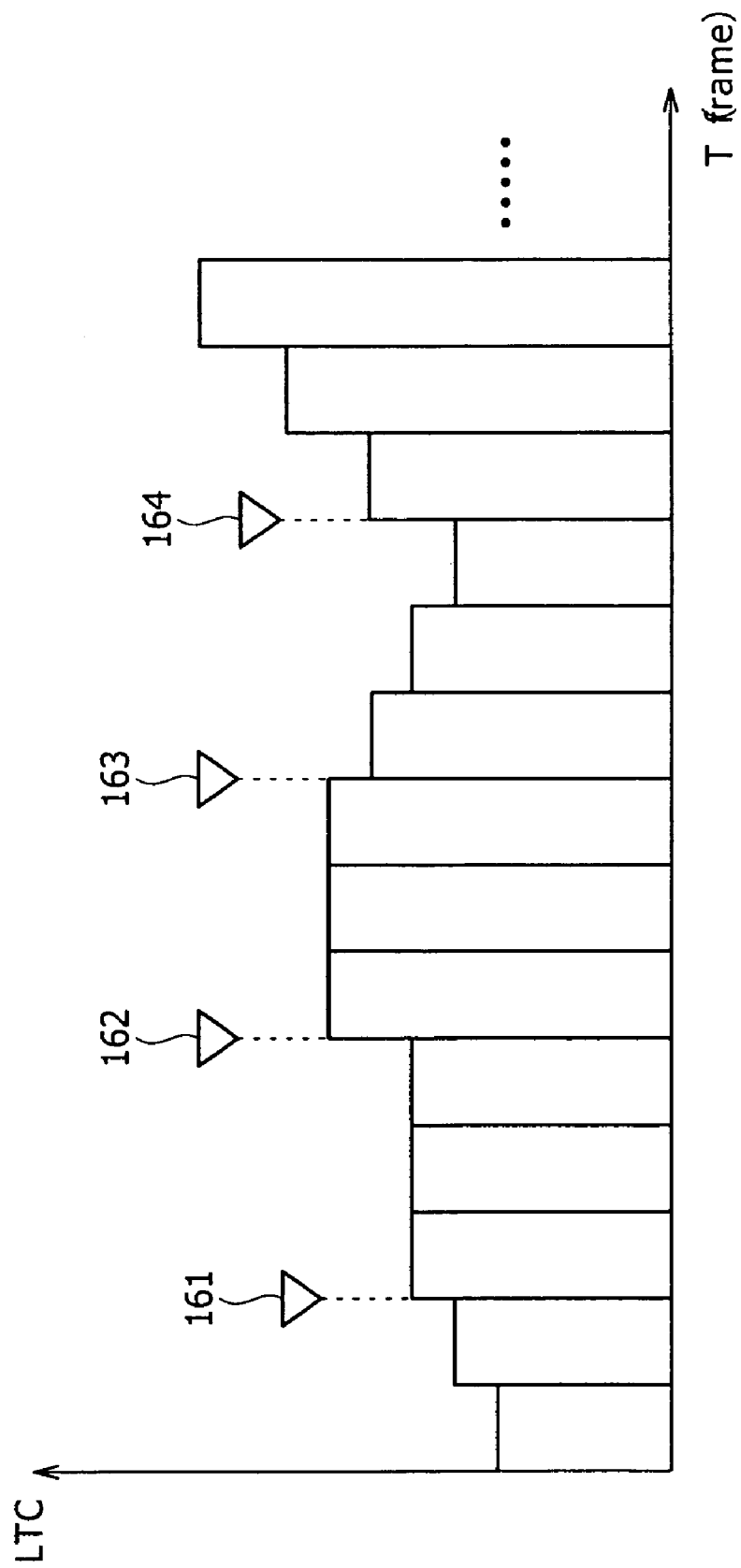
FIG. 10 is a diagram illustrating an example of LTC change points.

The following describes the above-mentioned LTC change point table. FIG. 10 shows an exemplary graph indicative of LTC change points. In this graph, the horizontal axis is indicative of time T (the number of frames) and the vertical axis is indicative of LTC value.

Because LTC is a time code, the value thereof monotonously increases (or linearly changes) frame by frame in general in taken image data. However, if a plurality of clips are coupled, some frames are deleted, or the value itself of LTC is edited in an editing operation, the value of LTC does not always change in a linear manner; for example, a manner in which the value of LTC changes may change, such as changing from monotonous increase to monotonous decrease (namely, a nonlinear change). A frame at which the manner of change of LTC value changes as described above is referred to a change point.

Referring to FIG. 10, frames 161 through 164 are change points, for example. In the case of the frame 161, for example, the LTC value increases by a predetermined amount (monotonous increase) every time one frame is processed (or every time advance is made along the horizontal axis) immediately before the frame 161. In contrast, in the frames subsequent to the frame 161, no change occurs in the LTC value along the frames. Thus, a manner in which the LTC value changes-changes, the frame 161 is determined to be a change point.

Likewise, the manner in which LTC value changes before and after the frames 162 through 164, so that these provide change points. The change points such as with the frames 161 through 164 are extracted and the associated frame numbers and LTC values are tabulated into an LTC change point table, which is registered in the nonrealtime metadata file 82.

The LTC change point table as described above is used for searching for frames on the basis of LTC, for example.

Figure 11:
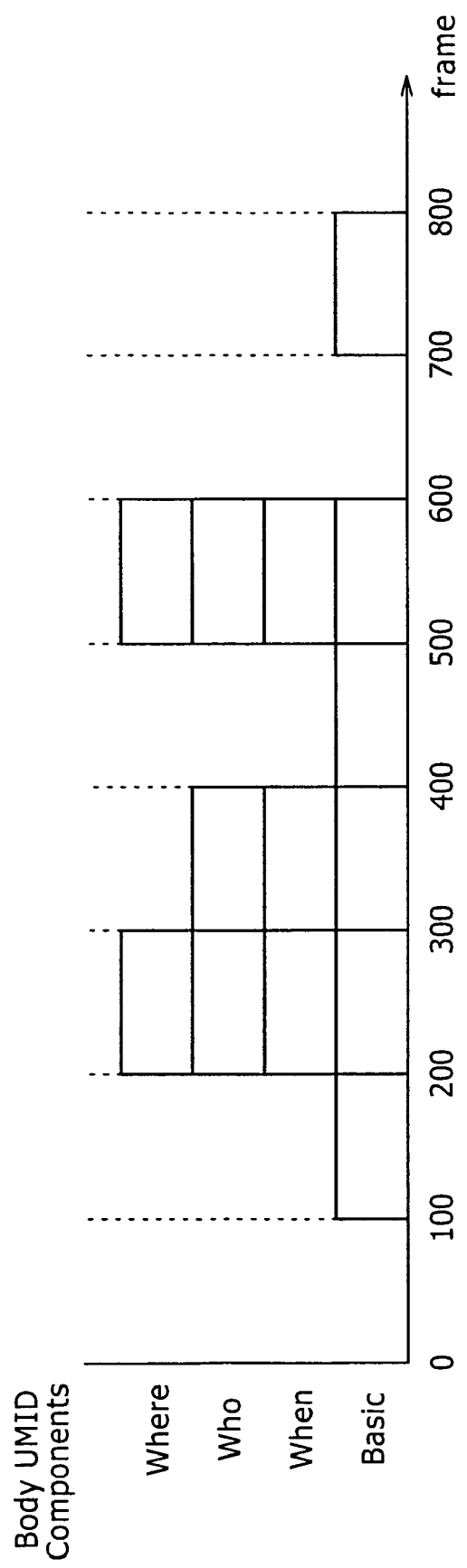
FIG. 11 is a diagram illustrating an example of basic UMID point, time information change point, positional information change point, and personal information change point.

The following describes the above-mentioned basic UMID change point table, time information change point table, positional information change point table, and personal information change point table. FIG. 11 shows examples of basic UMID change point, time information change point, positional information change point, and personal information change point. In the graph shown in FIG. 11, the horizontal axis is indicative of time T (the number of frames) and the vertical axis is indicative of the UMID configuration (Basic, When, Who, and Where) of each frame of image data.

The configuration of UMID is as shown in FIG. 8, composed of basic information (Basic), time information (When), positional information (Where), and personal information (Who). Frames in which these pieces of information change in the UMIDs allocated to frames are tabulated as change points.

For example, referring to FIG. 11, no UMID is attached to frames 0 through 99 that have none of basic information (Basic), time information (When), positional information (Where), and personal information (Who). However, the basic UMID having only basic information is attached to frames 100 through 199. Therefore, the frame 100 provides a change point of basic information (Basic).

Here, basic UMID having only basic information is attached to frames 100 through 199. To frames 200 through 299, extended UMID having all of basic information (Basic), time information (When), positional information (Where), and personal information (Who) is attached. Therefore, frame 200 provides a change point of time information (When), positional information (Where), and personal information (Who).

The change points of these pieces of information are extracted to be registered in the nonrealtime metadata file 82 as a change point table.

Figure 12:
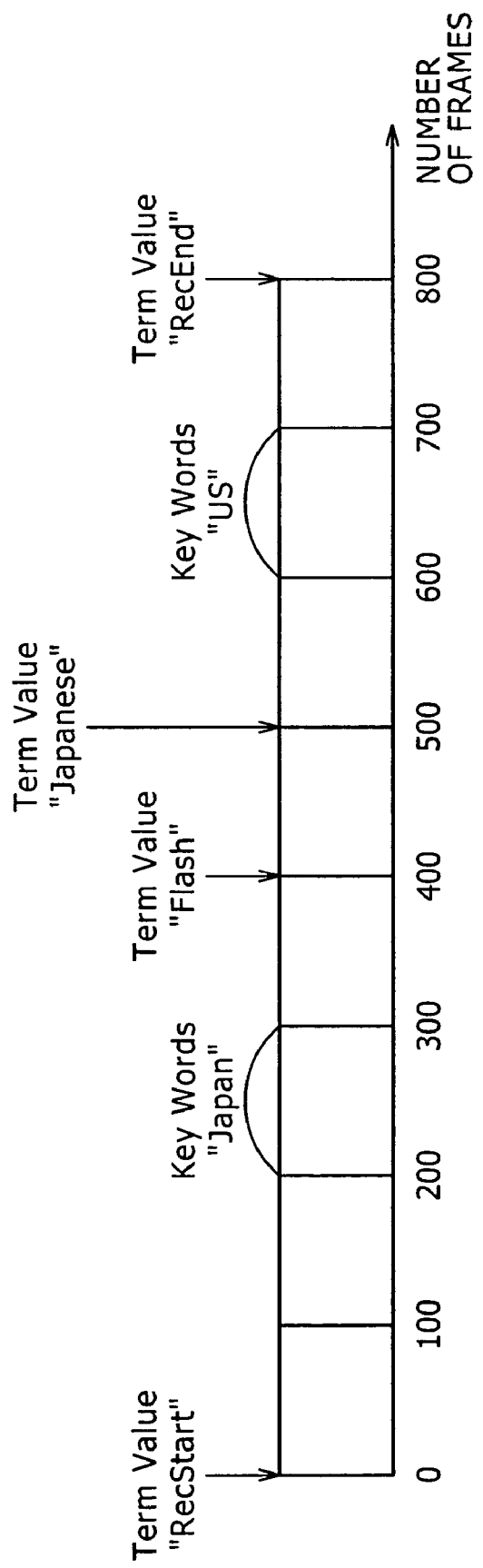
FIG. 12 is a diagram illustrating an exemplary KLV packet.

The following describes the above-mentioned KLV packet table. FIG. 12 shows an exemplary KLV packet. In the figure, the horizontal axis represents time T (the number of frames) Namely, FIG. 12 shows to which frame of what frame number a particular KLV packet is attached.

For example, in FIG. 12, the start frame of frame number "0" is attached with an essence marker indicative of "recording start (RecStart) as a KLV packet. Frames "200" through "300" are attached with a character string "Japan" (or keywords) as a KLV packet. The frame of frame number "400" is attached with an essence marker indicative of the use of flash as a KLV packet. The frame of frame number "500" is attached with an essence marker indicative of "Japanese" as a KLV packet. The frames having frame numbers "600" through "700" are attached with a character string (or key words) "US" as a KLV packet. The last frame having frame number "800" is attached with an essence marker indicative of "recording end (RecEnd) as a KLV packet.

The information about the frames attached with the KLV packets are tabulated to be registered in the nonrealtime metadata file 82.

It should be noted that the information associated with the above-mentioned image data video format includes the standard (port) of the format of image data, the standard (videoCodec) of codec of image data, the number of frames per second (recFps) at recording, the number of frames (playFps) per second at reproduction, the number of pixels per screen (pixel, numOfVerticalLine), and scanning (VideoScan).

The above-mentioned audio data format of audio data includes the channel number (cast) of audio data, the signaling scheme (port) of signal, and codec scheme for example as the information associated with the audio format for each channel.

Further, the above-mentioned information associated with the hardware and software used in data recording and editing includes the maker name (manufacturer) of the hardware, the serial number (serialNO), model name (modelName), hardware name (hardware), and software version information (software).

The following describes the edit list file shown in FIG. 5. The edit list file is a file that includes the results of the non-destructive editing of clips and also describes a method of reproducing these editing results.

The XML description of the edit list file is largely divided into a header portion and a body portion. The header portion describes the information about an edit list metadata file existing in the same edit list directory. In the body portion, a clip for use in editing is specified by UMID. This body portion describes the information of the editing results using the clip and a method of reproducing the editing results. The XML description of the edit list file describes the information about the non-destructive editing of a clip specified by UMID.

The following describes the editing of the data having the above-mentioned structure. For example, if the edit device 13 shown in FIG. 1 edits the material data 21 and the metadata 22 recorded to the optical disc 12, one of the two methods are used; in one method (destructive editing), the material data 21 and the metadata 22 subject to editing are updated and, in the other method (non-destructive editing), the material data 21 and the metadata 22 subject to editing are left unprocessed, with the data indicative of editing results being newly generated.

Figure 13:
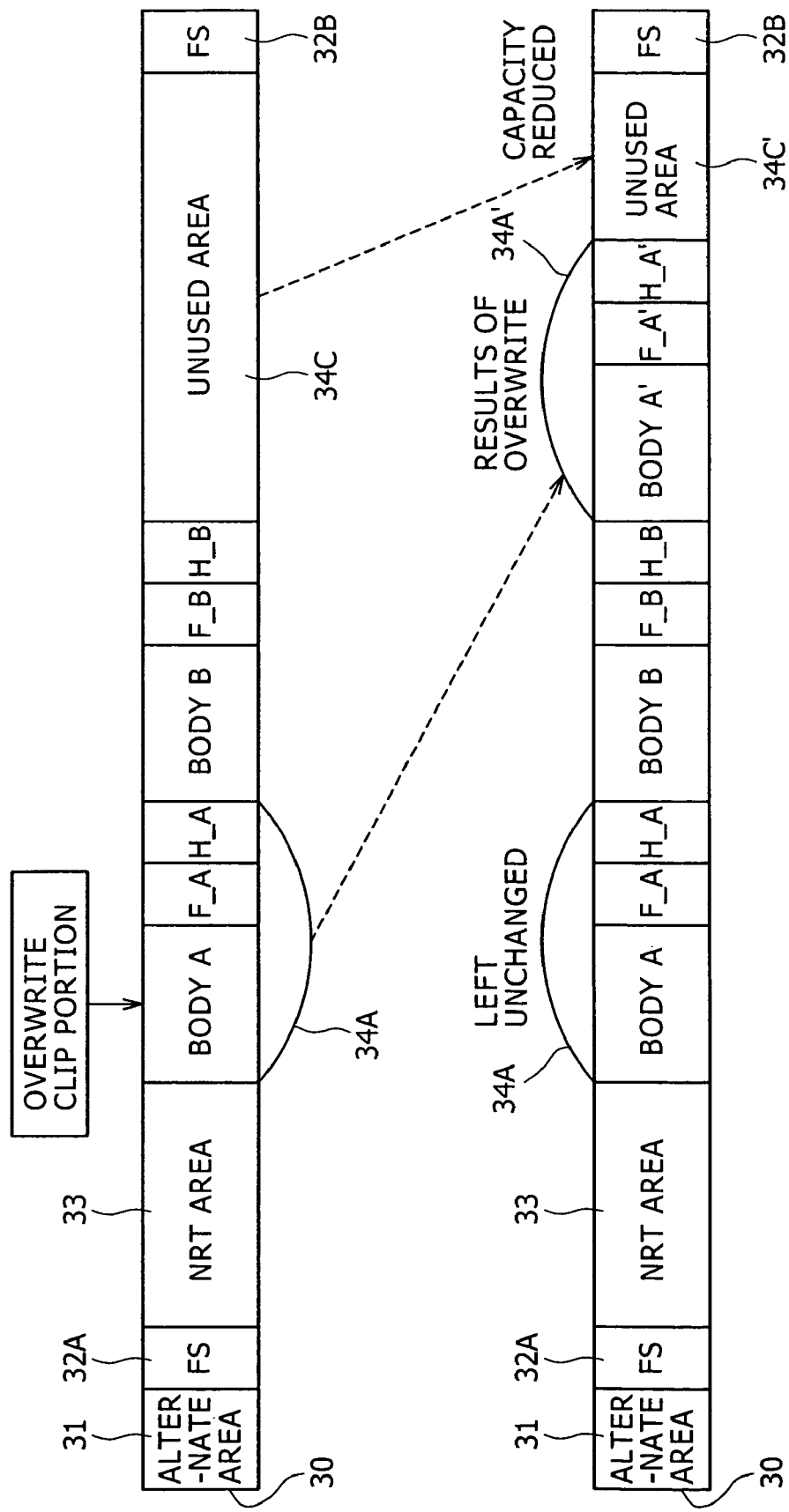
FIG. 13 is a diagram illustrating a manner of non-destructive editing.

FIG. 13 shows a manner in which non-destructive editing is executed. Shown in FIG. 13 is non-destructive editing executed in the storage area of the optical disc 12 described with reference to FIG. 2. The upper portion of the figure shows a configuration of the storage area of the optical disc 12 before editing, while the lower portion shows a configuration of the storage area of the optical disc 12 after editing.

In the upper portion of FIG. 13, when body A of the clip 34A is partially overwritten, the original clip 34A is left unchanged as shown in the lower portion in the case of non-destructive editing and clip 34A' (body A', footer F_A', and header H_A') that is a result of the overwrite of the clip 34A is newly written to the unused area 34C. Therefore, when a non-destructive editing operation has been executed, the capacity of the unused area 34C is narrowed by an amount occupied by the recording of the editing result. However, because the unedited clip 34A remains, the user may easily obtain this unedited clip 34A even after the editing operation.

Figure 14:
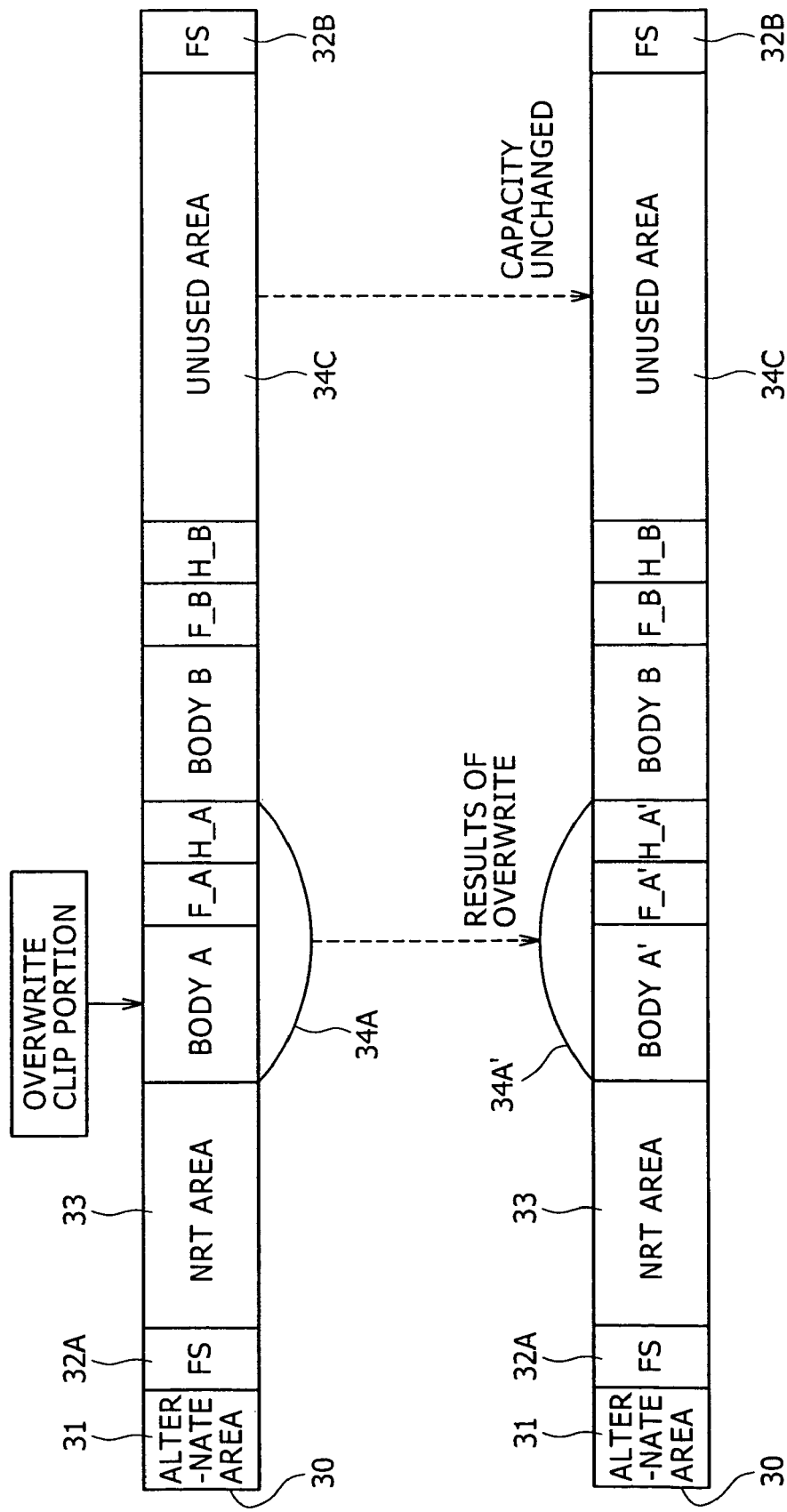
FIG. 14 is a diagram illustrating a manner of destructive editing.

In contrast, FIG. 14 shows a manner in which destructive editing is executed. Shown in FIG. 14 is how a destructive editing is executed in the storage area of the optical disc 12 described with reference to FIG. 2. The upper portion of the figure shows a configuration of the storage area of the optical disc 12 before editing, while the lower portion shows a configuration of the storage area of the optical disc 12 after editing.

When body A of the clip 34A is overwritten in the upper portion of FIG. 14, the original clip 34A becomes 34A' (body A', footer F-A', and header H_A') that is a result of the update and overwrite as shown in the lower portion in the case of destructive editing. Therefore, if the data amount remains unchanged before and after editing operation, executing a destructive editing operation does not change the capacity of the unused area 34C. However, because the clip 34A before editing is not left, the user cannot easily obtain the unedited 34A after editing.

As described above, the material data 21 and the metadata 22 recorded to the optical disc 12 may be referenced by other data by use of UMID. Therefore, in the case of destructive editing, not only when contents of data are shared by a plurality of files but also when a file subject to editing is referenced (or linked) by another file by use of UMID, this referencing file must also be updated in accordance with the change of the UMID of the file subject to editing in order to maintain this link.

Figure 15:
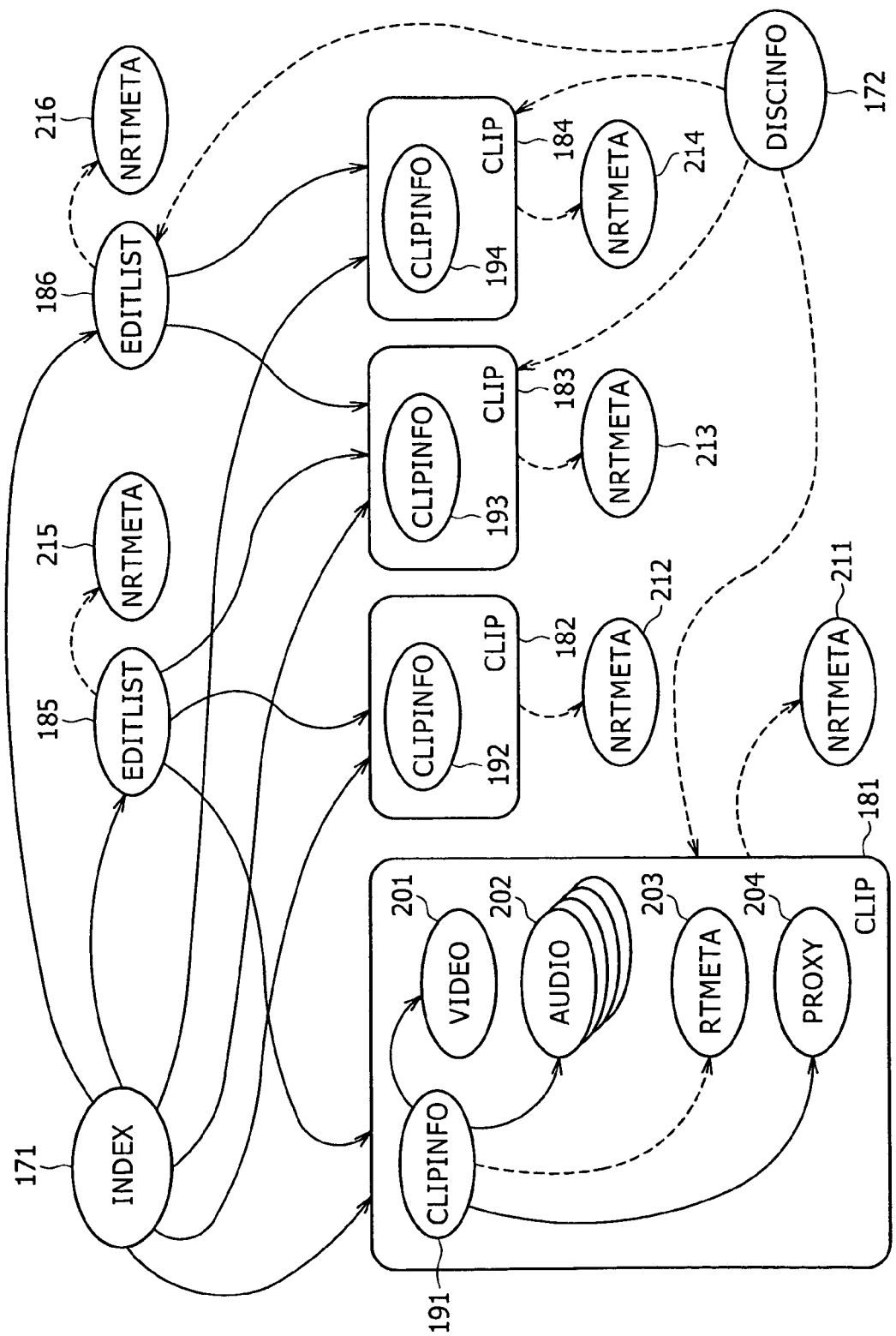
FIG. 15 is a diagram illustrating a manner in which reference is made between files.

FIG. 15 shows an exemplary relationship of the reference between files on the optical disc 12. Referring to FIG. 15, solid-line arrows are indicative of references made by use of UMID, dashed-line arrows are indicative of references made by use of directory and file name, and the direction of each arrow is indicative of the direction of reference.

For example, an index file (INDEX) 171 references a clip (CLIP) 181 through clip (CLIP) 184 (to be precise, a clip information file (CLIPINFO) 191 through clip information file (CLIPINFO) 194) and an edit list file (EDITLIST) 185 and an edit list file (EDITLIST) 186 by use of UMID. A disc information file (DISCINFO) 172 references the clip 181 (to be precise, a clip information file 191), the clip 183 (to be precise, a clip information file 193), the clip 184 (to be precise, a clip information file 194), and the edit list file 186 by use of directory and file name.

Further, in the clip 181, the clip information file 191 references an image data file (VIDEO) 201, an audio data file (AUDIO) 202, and a low-resolution data file (PROXY) 204 by use of UMID. The clip information data file 191 also references a realtime metadata file (RTMETA) 203 by use of directory and file name. The clip 181 (to be precise, the clip information file 191) references nonrealtime metadata files 211 by use of directory and file name.

The reference by the clips 182 through 184 is the same as that of the clip 181, so that the description thereof will be skipped. For example, the clips 182 through 184 (to be precise, the clip information files 192 through 194) reference a nonrealtime metadata file (NRTMETA) 212 through 214 by use of directory and file name.

The edit list file 185 references the clips 181 through 183 (to be precise, the clip information files 191 through 193) by use of UMID. Namely, The edit list file 185 is indicative of the edit results of the clips 181 through 183. It should be noted that the edit list 185 references a nonrealtime metadata file for edit list (NRTMETA) 215 by use of directory and file name.

Likewise, the edit list file (EDITLIST) 186 references the clips 183 and 184 (to be precise, clip information files 193 and 194) by use of UMID. Namely, the edit list file 186 is indicative of the edit results of the clip 183 and the clip 184. It should be noted that the edit list file 186 references a nonrealtime metadata file for edit list (NRTMETA) 216 by use of directory and file name.

In the optical disc 12, each file references other files as described above, thereby sometimes forming complicated reference relationships. Therefore, if the image data file 201 and some audio data files are destructively edited, the contents of the realtime metadata file 203 and the low-resolution data file 204 may be required to be updated. In addition, if the UMID of the image data file 201 is changed, the clip information file 191 may be required to be updated. Further, because the UMID of the clip information file 191 is also updated by the updating of the clip information file 191 itself, the index file 171, the disc information file 172, and the edit list file 185 must also sometimes be updated.

When the data recorded to the optical disc 12 is destructively edited, the edit device 13 shown in FIG. 1 maintains the reference relationships of all files on the optical disc 12 after the editing and, in order to prevent a mismatch from occurring at the time of reproduction for example, updates not only the files subject to editing but also other files that reference these files subject to editing.

Figure 16:
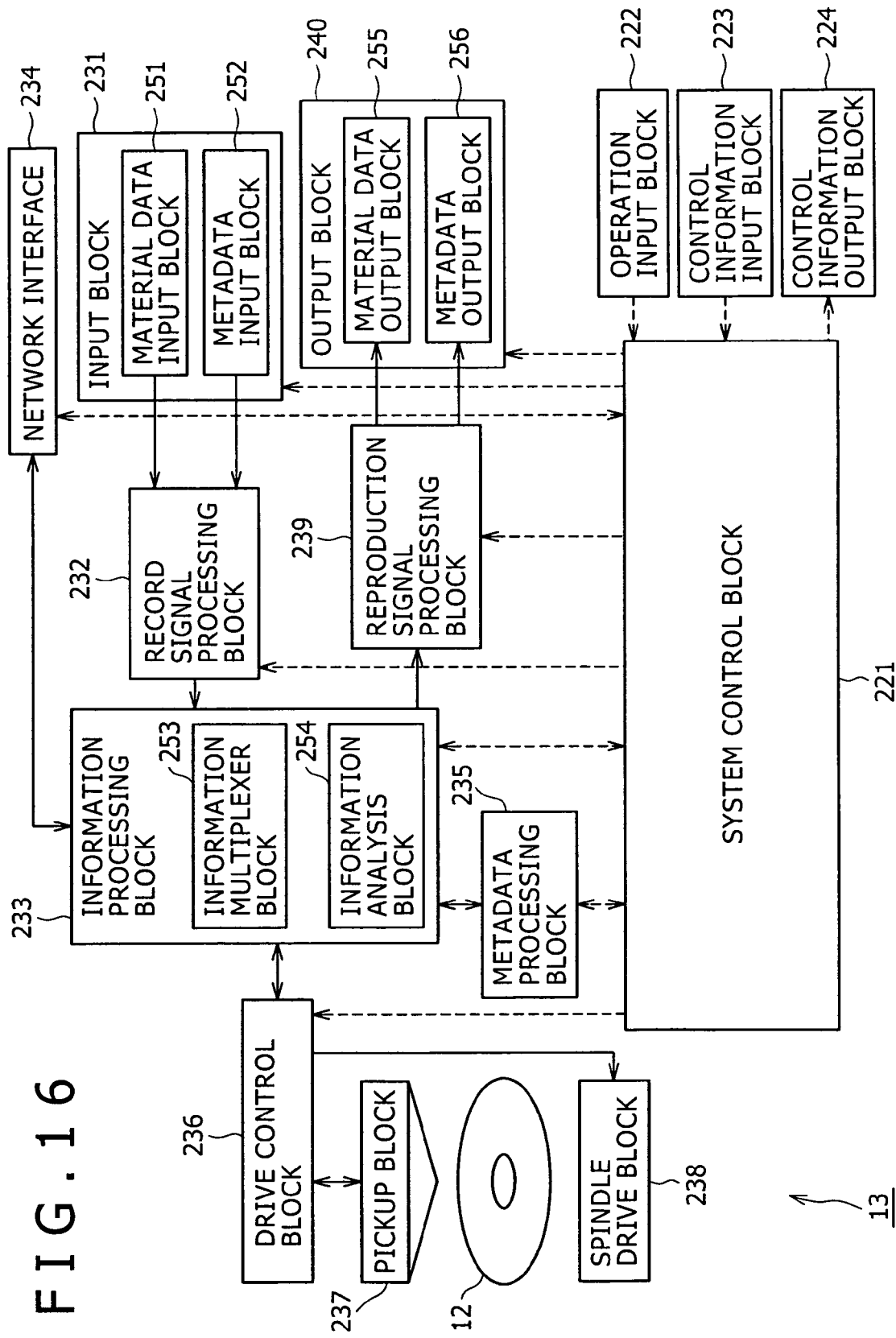
FIG. 16 is a block diagram illustrating an exemplary configuration of an edit device shown in FIG. 1 to which the present invention is applied.

FIG. 16 is a block diagram illustrating an exemplary configuration of the edit device 13 shown in FIG. 1 to which the present embodiment is applied.

Referring to FIG. 16, the edit device 13 has a system control block 221, an operation input block 222, an control information input block 223, a control information output block 224, an input block 231, a record signal processing block 232, an information processing block 233, a network interface 234, a metadata processing block 235, a drive control block 236, a pickup block 237, a spindle drive block 238, a reproduction signal processing block 239, and an output block 240.

The system control block 221 controls the edit device 13 in its entirety and has an arithmetic block, a control block, and a storage block, not shown, for example, thereby executing processing associated with control of each component of the edit device 13. The operation input block 222 is made up of input devices such as a keyboard and buttons for example through which a user enters commands and data for example to be supplied to the system control block 221.

The control information input block 223 receives, from the outside of the edit device 13, as control information, the information other than that associated with content such as material data and metadata for example and supplies the received control information to the system control block 221. The control information output block 224 outputs, to the outside of the edit device 13, the information other than that associated with content such as the material data and metadata to be supplied to the system control block 221.

The input block 231 is a processing block for receiving the information associated with content to be supplied from the outside of the edit device 13 and has a material data input block 251 for receiving material data (image data and audio data for example) from the outside of the edit device 13 and a metadata input block 252 for receiving metadata (realtime metadata and nonrealtime metadata for example) from the outside of the edit device 13. The material data input block 251 supplies the received material data to the record signal processing block 232 and the metadata input block 252 supplies the received metadata to the record signal processing block 232.

The record signal processing block 232 executes signal processing on the material data and metadata supplied from the input block 231 to convert the data from transmission format into recording format. The record signal processing block 232 supplies the processed data to the information processing block 233.

The information processing block 233 executes the processing associated with the editing of material data under the control of the system control block 221. For example, information processing block 233 has an information multiplexing block 253 for multiplexing plural pieces of data and an information resolution block 254 for resolving one piece of information into plural pieces of information, there executing the processing of combining and dividing. These material data and metadata subject to editing are supplied from the record signal processing block 232, the network interface 234, or the drive control block 236, for example. Getting the material data and metadata thus supplied, the information processing block 233 edits the material data under the control of the system control block 221 and supplied the edited data to the network interface 234, drive control block 236, and reproduction signal processing block 239. It should be noted that the editing of metadata is executed in the metadata processing block 235. Therefore, the information processing block 233 supplies the supplied metadata to the metadata processing block 235.

The network interface 234 is an interface connected to a LAN (Local Area Network) such as Ethernet™ or the Internet for example to communicate with communication devices other than the edit device 13 interconnected on a same network, thereby getting material data and metadata from other devices and supplying the obtained data to the information processing block 233 and the material data and metadata supplied from the information processing block 233 to other devices. The metadata processing block 235 edits the metadata supplied from the information processing block 233 under the control of the system control block 221, returning the edited metadata to the information processing block 233.

The drive control block 236 is a processing block for controlling components of a drive, not shown, on which the optical disc 12 is loaded in the edit device 13. The drive control block 236 controls the pickup block 237 that, under the control of the system control block 221, reads and writes information from and to the optical disc 12 loaded on the drive and the spindle drive block 238 that controls the drive of the optical disc 12 loaded on the drive. Then, the drive control block 236 supplies the data read by the pickup block 237 to the information processing block 233 by controlling the pickup block 237 and the spindle drive block 238. Further, the drive control block 236 writes (or records) the data supplied from the information processing block 233 to the optical disc 12 through the pickup block 237 by controlling the pickup block 237 and the spindle drive block 238.

The pickup block 237 irradiates a laser beam onto the optical disc 12 loaded on the drive to read data from the optical disc 12, supplies the data to the drive control block 236, and writes the data supplied from the drive control block 236 onto the optical disc 12 under the control of the drive control block 236. At this moment, the pickup block 237 slides in the radial direction relative to the optical disc 12 under the control of the drive control block 236, thereby controlling the radial access position relative to the optical disc 12. The spindle drive block 238 controls the mainly the rotation of the optical disc 12 loaded on the drive, thereby controlling the access position in rotational direction of the optical disc 12.

The reproduction signal processing block 239 processes an output signal (or a reproduction signal) supplied from the information processing block 233. The reproduction signal processing block 239, for example, converts the recording format of each data into the transmission format. The reproduction signal processing block 239 supplies the processed data to the output block 240.

The output block 240 outputs content-associated information to the outside of the edit device 13 and has a material data output block 255 for outputting the material data (image data and audio data for example) supplied from the reproduction signal processing block 239 to the outside and a metadata output block 256 for outputting the metadata (realtime metadata and nonrealtime metadata for example) supplied from the reproduction signal processing block 239 to the outside. It should be noted that the output block 240 may have a display monitor, a speaker, or other output devices, thereby outputting a reproduction signal supplied from the reproduction signal processing block 239 to these output devices.

The above-mentioned components operate under the control of the system control block 221, thereby executing the processing associated with the editing and outputting (or reproduction) of the material data 21 and the metadata 22 recorded to the optical disc 12.

Figure 17:
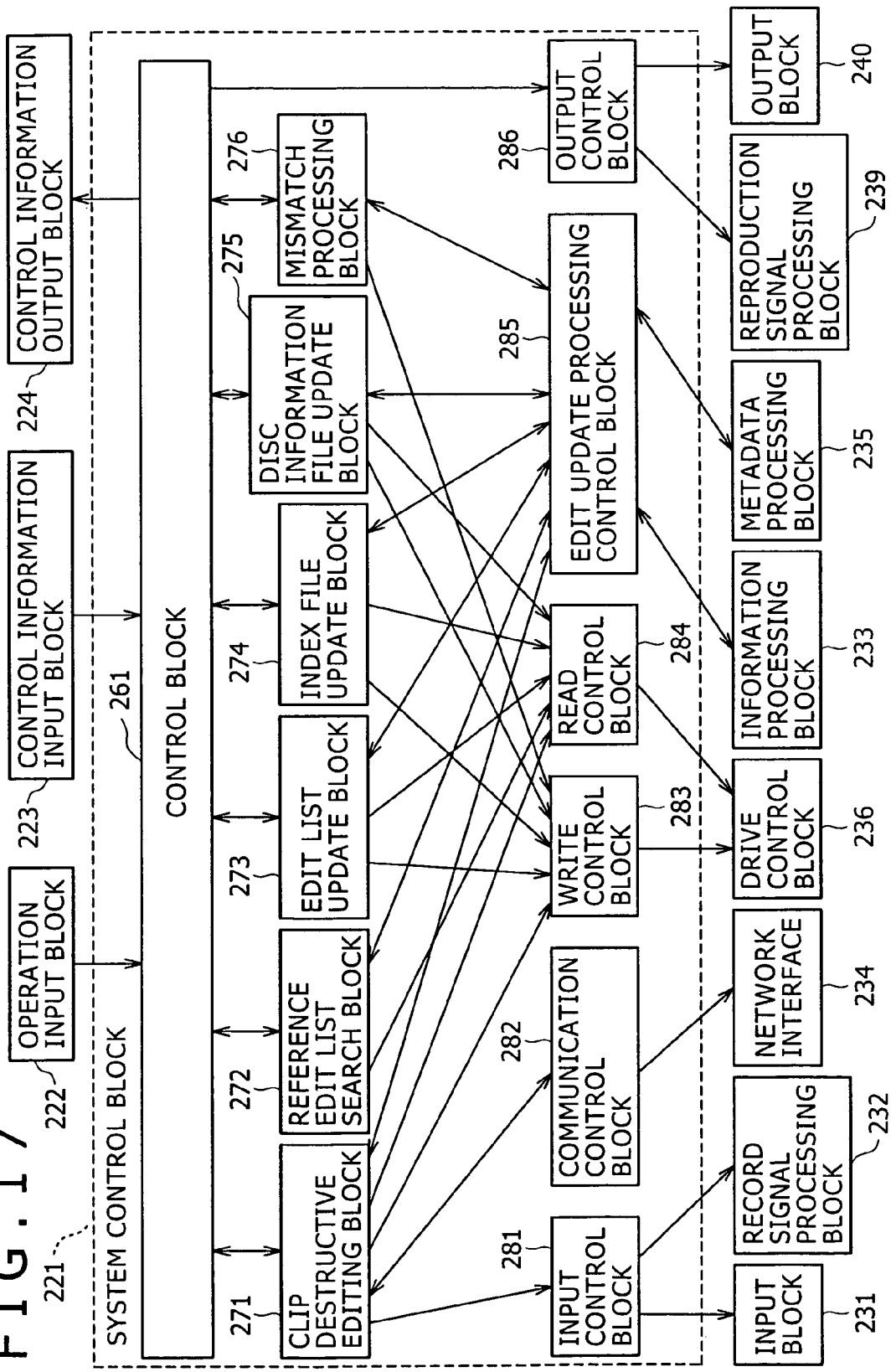
FIG. 17 is a block diagram illustrating an exemplary detail configuration of a system control block shown in FIG. 16.

FIG. 17 is a block diagram illustrating a detail exemplary configuration of the system control block 221 shown in FIG. 16.

Referring to FIG. 17, the system control block 221 has a control block 261, a clip destructive edit block 271, a reference edit list search block 272, an edit list update block 273, an index file update block 274, a disc information file update block 275, a mismatch processing block 276, an input control block 281, a communication control block 282, a write control block 283, a read control block 284, an edit update processing control block 285, and an output control block 286. The components are divided into three layers. The control block 261 for controlling the system control block 221 in its entirety forms the top layer. The clip destructive edit block 271, the reference edit list search block 272, the edit list update block 273, the index file update block 274, the disc information file update block 275, and the mismatch processing block 276 form the second layer in order to execute desired processing. The input control block 281, the communication control block 282, the write control block 283, the read control block 284, the edit update processing control block 285, and the output control block 286 form the bottom layer that controls the processing blocks other than the system control block 221 of the edit device 13.

The control block 261 controls the start and end of the processing that is executed by the clip destructive edit block 271, reference edit list search block 272, edit list update block 273, index file update block 274, disc information file update block 275, or the mismatch processing block 276 and controls the cooperation with other processing. The control block 261 also controls the above-mentioned components on the basis of the operation input information supplied from the operation input block 222 and the control information supplied from the control information input block 223. Further, the control block 261 supplies control information to the control information output block 224 to output the control information to the outside of the edit device 13 via the control information output block 224. Besides, the control block 261 controls the output control block 286, thereby controlling the processing associated with the outputting of material data and metadata.

The clip destructive edit block 271 controls the input control block 281, the communication control block 282, the write control block 283, the read control block 284, and the edit update processing control block 285, thereby executing the processing associated with the destructive editing of clip's image data, audio data, realtime metadata, proxy data, and nonrealtime metadata. To be more specific, the clip destructive edit block 271 controls the input block 231 and the record signal processing block 232 via the input control block 281, supplying the material data and metadata inputted from the outside of the edit device 13 to the information processing block 233. Also, the clip destructive edit block 271 controls the network interface 234 via the communication control block 282, thereby supplying the material data and metadata supplied from other devices to the information processing block 233 and the edit results outputted from the information processing block 233 to other devices. Besides, the clip destructive edit block 271 controls the drive control block 236 via the write control block 283, thereby writing the edit results outputted from the information processing block 233 to the optical disc 12. Further, the clip destructive edit block 271 controls the drive control block 236 via the read control block 284 to read the material data and metadata subject to editing from the optical disc 12 and supplies these data to the information processing block 233. Still further, the clip destructive edit block 271 controls the information processing block 233 and the metadata processing block 235 via the edit update processing control block 285 to execute the processing associated with the editing of material data and metadata.

The reference edit list search block 272 controls the read control block 284 and the edit update processing control block 285 to execute the processing associated with the searching of an edit list for referencing a clip to be destructively edited. To be more specific, the reference edit list search block 272 controls the drive control block 236 via the read control block 284 to read an edit list from the optical disc 12 and supplies this edit list to the information processing block 233. Further, the reference edit list search block 272 controls the information processing block 233 and the metadata processing block 235 via the edit update processing control block 285 to reference the read edit list, thereby executing the processing of searching the edit list for referencing a clip to be destructively edited.

The edit list update block 273 controls the write control block 283 and the edit update processing control block 285 to execute the processing of the updating of the edit list retrieved by the reference edit list search block 272. To be more specific, the edit list update block 273 controls the drive control block 236 via the write control block 283 to write the updated edit list to the optical disc 12. Further, the edit list update block 273 controls the information processing block 233 and the metadata processing block 235 via the edit update processing control block 285 to update the edit list for referencing the destructively edited clip in accordance with the destructive editing thereof.

The index file update block 274 controls the write control block 283, the read control block 284, and the edit update processing control block 285 to execute the processing of updating an index file recorded to the optical disc 12. To be more specific, the index file update block 274 controls the drive control block 236 via the write control block 283 to write the updated index file to the optical disc 12. The index file update block 274 also controls the drive control block 236 via the read control block 284 to read an index file from the optical disc 12, supplying the read index file to the information processing block 233. Further, the index file update block 274 controls the information processing block 233 and the metadata processing block 235 via the edit update processing control block 285 to update the index file in accordance with the destructive editing of the executed clip.

The disc information file update block 275 controls the write control block 283, the read control block 284, and the edit update processing control block 285 to execute the processing associated with the updating of a disc information file recorded to the optical disc 12. To be more specific, disc information file update block 275 controls the drive control block 236 via the write control block 283 to write the updated disc information file to the optical disc 12. Also, the disc information file update block 275 controls the drive control block 236 via the read control block 284 to read a disc information file from the optical disc 12 to supply the read file to the information processing block 233. Further, the disc information file update block 275 controls the information processing block 233 and the metadata processing block 235 through the edit update processing control block 285 to update a disc information file (if it is referencing a destructively edited clip) in accordance with the destructive editing of the executed clip.

The mismatch processing block 276 controls the write control block 283 and the edit update processing control block 285 to execute the outputting and recording of mismatch information generated when no match is intentionally provided between files in accordance with a user instruction, such as not updating a file that references a destructively edited file, for example. To be more specific, the mismatch processing block 276 controls the drive control block 236 via the write control block 283 to write the generated mismatch information to the optical disc 12. Also, the mismatch processing block 276 controls the information processing block 233 and the metadata processing block 235 via the edit update processing control block 285 to get the generated mismatch information and supplies the obtained mismatch information to the control block 261. Further, mismatch processing block 276 supplies the mismatch information generated in the information processing block 233 and the metadata processing block 235 to the control block 261, thereby outputting the mismatch information to the outside of the edit device 13 via the control information output block 224 or the outside of the edit device 13 from the output block 240 via the output control block 286.

The input control block 281 controls the input block 231 and the record signal processing block 232 to execute the processing of receiving the material data and metadata to be entered from the outside of the edit device 13 into the input block 231. The communication control block 282 controls the network interface 234 to execute the processing associated with communication with other devices. The write control block 283 controls the drive control block 236 to execute the processing associated with the writing of data to the optical disc 12. The read control block 284 controls the drive control block 236 to execute the processing of reading data from the optical disc 12. The edit update processing control block 285 controls the information processing block 233 and the metadata processing block 235 to execute the processing associated with the destructive editing of the material data held in the information processing block 233 or the metadata held in the metadata processing block 235, for example. The output control block 286 controls the reproduction signal processing block 239 and the output block 240 to execute the processing associated with the outputting of the data supplied from the information processing block 233 to the outside of the edit device 13.

FIG. 18 is a block diagram illustrating a detail exemplary configuration of the clip destructive edit block 271 shown in FIG. 17.

Referring to FIG. 18, the clip destructive edit block 271 has a clip read block 301, a material data destructive edit processing block 302, an update metadata identification block 303, a realtime metadata update block 304, a proxy data update block 305, a nonrealtime metadata update block 306, a deficient metadata generation block 307, a clip information file update block 308, a clip write block 309, an update confirmation processing block 311, and a mismatch information generation block 312.

The clip read block 301 controls the read control block 284 to read a clip from the optical disc 12 to destructively edit as specified by the control block 261. The material data destructive edit processing block 302 controls the edit update processing control block 285 to destructively edit the material data read from the optical disc 12. The update metadata identification block 303 controls the edit update processing control block 285 to identify the metadata that will be affected (or required for updating) by the destructive editing by the material data destructive edit processing block 302.

The realtime metadata update block 304 controls the edit update processing control block 285 if the updating of realtime metadata is found required by the update metadata identification block 303, thereby updating the realtime metadata such that the realtime metadata corresponds to the destructive editing executed by the material data destructive edit processing block 302. At this moment, the realtime metadata update block 304 controls the update confirmation processing block 311 to determine whether the user allows the updating of the realtime metadata. If the permission of the updating is not found, the realtime metadata update block 304 controls the mismatch information generation block 312 to generate mismatch information indicative of occurrence of a mismatch between files. The proxy data update block 305 controls the edit update processing control block 285 to update proxy data such that the proxy data corresponds to the destructive editing executed by the material data destructive edit processing block 302. The nonrealtime metadata update block 306 controls the edit update processing control block 285 if the updating of nonrealtime metadata is found required by the update metadata identification block 303, to update the nonrealtime metadata such that the nonrealtime metadata corresponds to the destructively editing processing executed by the material data destructive edit processing block 302. At this moment, the nonrealtime metadata update block 306 controls the update confirmation processing block 311 to determine whether the user allows the updating of the nonrealtime metadata. If the permission of the updating is not found, the nonrealtime metadata update block 306 controls the mismatch information generation block 312 to generate mismatch information indicative of occurrence of a mismatch between files.

The deficient metadata generation block 307 controls the edit update processing control block 285 to generate deficient data if metadata runs short also by the updating by the realtime metadata update block 304 and the updating by the nonrealtime metadata update block 306 as with the case in which the addition of new metadata so far not existent becomes necessary by the destructive editing of material metadata, for example. The clip information file update block 308 controls the edit update processing control block 285 to update a clip information file such that the clip information file corresponds to the destructive editing executed by the material data destructive edit processing block 302. The clip write block 309 controls the write control block 283 to record, to the optical disc 12, each piece of data of the clip updated by the above-mentioned processing blocks.

The update confirmation processing block 311 controls the operation input block 222 and the control information output block 224 via the control block 261 to confirm the user whether to update metadata or not and supplies the result of the confirmation to the realtime metadata update block 304 or the nonrealtime metadata update block 306. The mismatch information generation block 312 generates mismatch data indicative of the occurrence of a mismatch between files in the update processing in the realtime metadata update block 304 or the updating processing in the nonrealtime metadata update block 306, if any.

Figure 19:
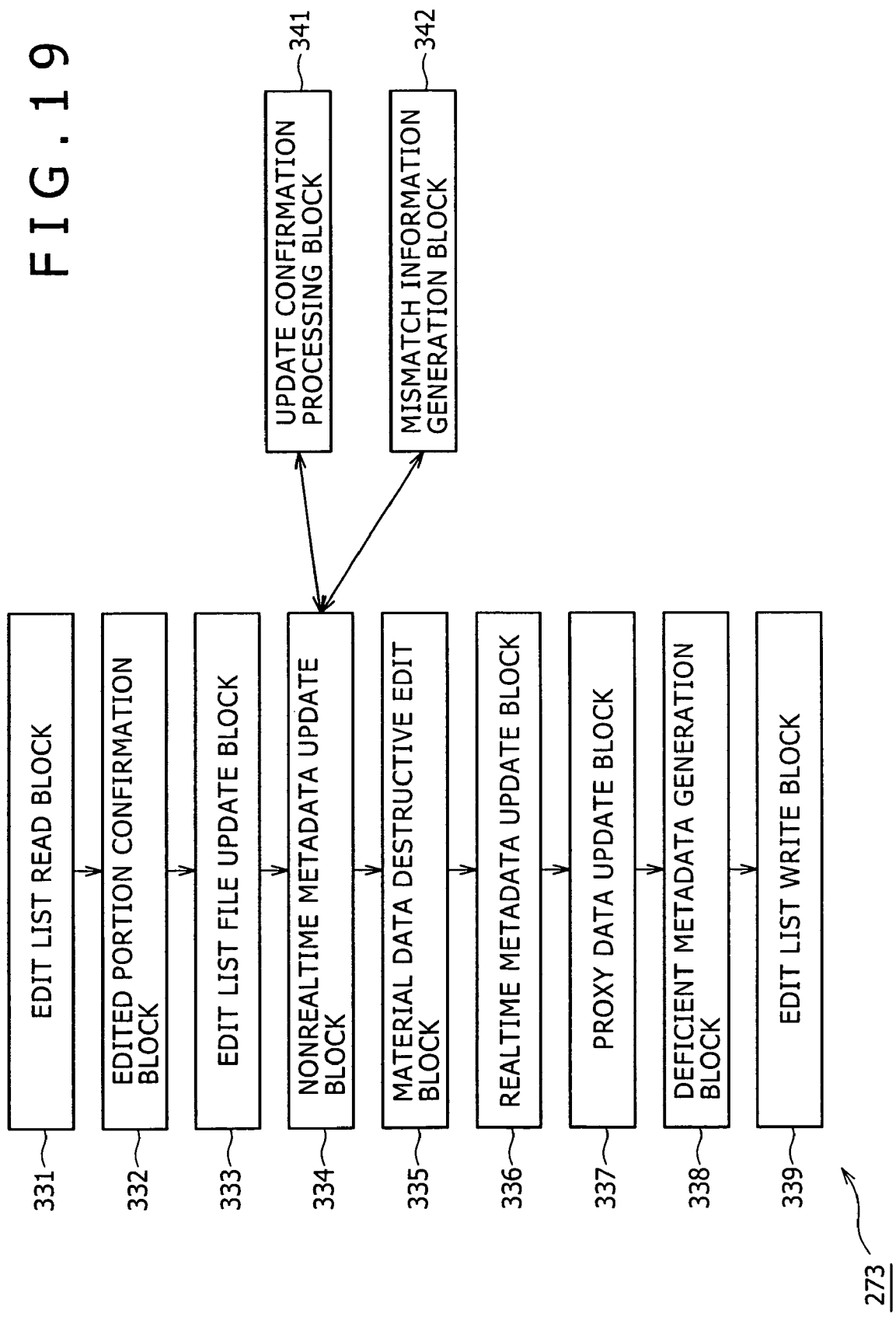
FIG. 19 is a block diagram illustrating an exemplary detail configuration of an edit list update block shown in FIG. 17.

FIG. 19 shows a block diagram illustrating a detail exemplary configuration of the edit list update block 273 shown in FIG. 17.

Referring to FIG. 19, the edit list update block 273 has an edit list read block 331, an edit portion confirmation block 332, an edit list file update block 333, a nonrealtime metadata update block 334, a material data destructive edit block 335, a realtime metadata update block 336, a proxy data update block 337, a deficient metadata generation block 338, an edit list write block 339, an update confirmation processing block 341, and a mismatch information generation block 342.

The edit list read block 331 controls the read control block 284 to read an edit list to be updated from the optical disc 12, the edit list being specified by the control block 261. The edit portion confirmation block 332 controls the edit update processing control block 285 and checks the edited portion in order to determine whether updating must be made in correspondence with clip destructive editing. The edit list file update block 333 controls the edit update processing control block 285 to update the edit list. The nonrealtime metadata update block 334 executes nonrealtime metadata update processing if the nonrealtime metadata for an edit list must be updated by clip destructive editing. The material data destructive edit block 335 controls the edit update processing control block 285 if edit result data that is the material data for a play list exists, thereby destructively editing the material data. The realtime metadata update block 336 controls the edit update processing control block 285 if edit result data exists, thereby updating realtime metadata. The proxy data update block 337 controls the edit update processing control block 285 if edit result data exists, thereby updating proxy data. The deficient metadata generation block 338 controls the edit update processing control block 285 to generate deficient data if metadata runs short also by the updating by the realtime metadata update block 334 and the updating by the nonrealtime metadata update block 336 as with the case in which the addition of new metadata so far not existent becomes necessary by the destructive editing of material metadata, for example. The edit list write block 339 control the write control block 283 to record, to the optical disc 12, each piece of data in the edit list updated by the above-mentioned processing blocks.

The update confirmation processing block 341 controls the operation input block 222 and the control information output block 224 via the control block 261 to confirm the user whether to update nonrealtime metadata for an edit list and supplies the result of the confirmation to the nonrealtime metadata update block 334. The mismatch information generation block 342 generates mismatch data indicative of the occurrence of a mismatch between files in the updating processing in the nonrealtime metadata update block 334, if any.

The following describes flows of processing operations to be executed by the edit device 13 configured as described above.

For example, if the user operates the operation input block 222 of the edit device 13 with the optical disc 12 loaded on the drive of the edit device 13 to enter a new clip into the edit device 13, thereby giving an instruction for executing, by use of the newly entered clip, destructive editing of the clip recorded on the optical disc 12, the control block 261 of the system control block 221 executes the specified destructive editing, starting the processing associated with the clip destructive editing.

Figure 20:
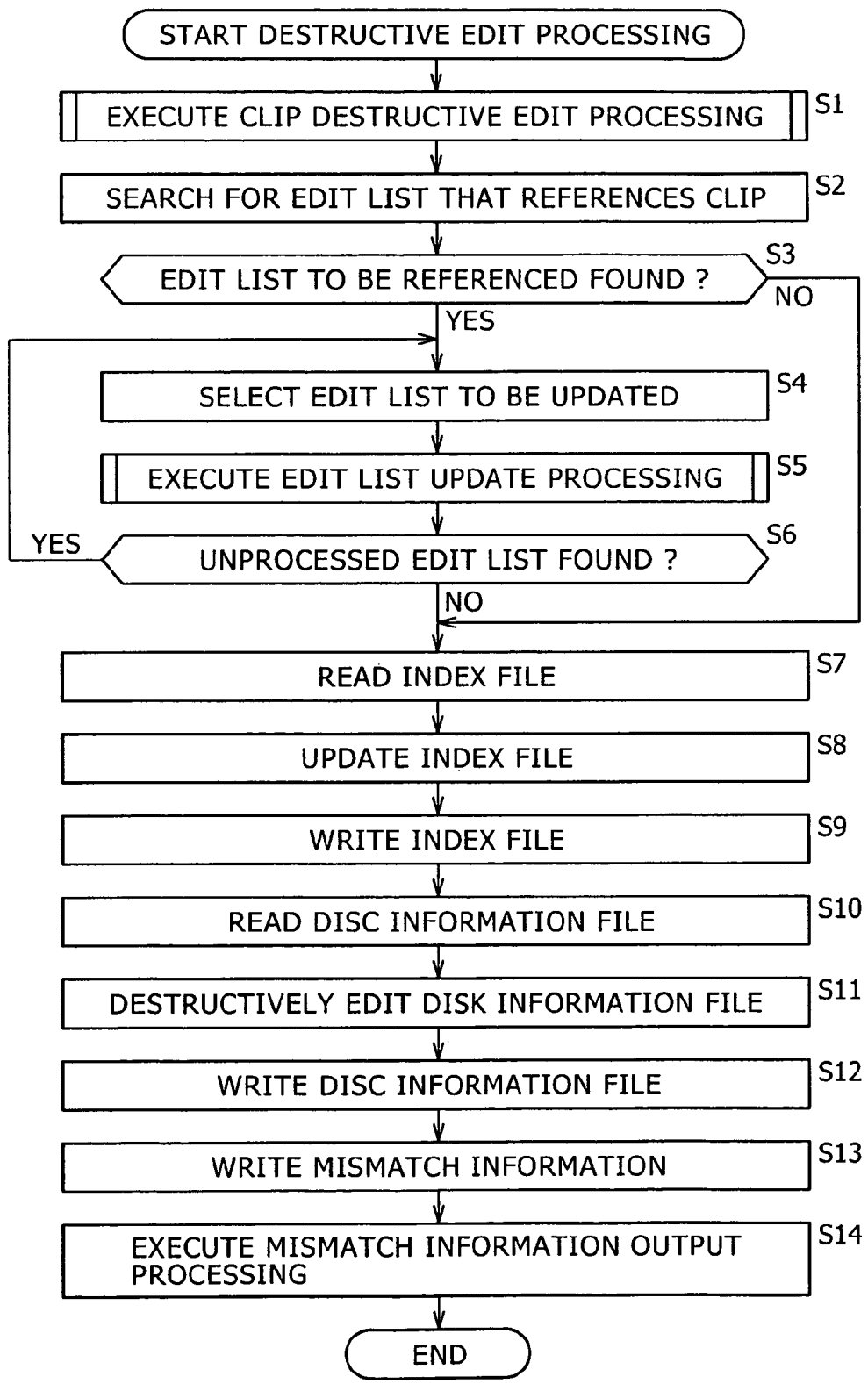
FIG. 20 is a flowchart indicative of an example of destructive edit processing.

The following describes a flow of the destructive editing with reference to a flowchart shown in FIG. 20.

When clip destructive editing starts, first, in step S1, the clip destructive edit block 271 executes clip destructive edit processing for destructively editing the specified clip. Details of this edit processing will be described later.

When the clip destructive edit processing ends, the reference edit list search block 272 controls the read control block 284 and the edit update processing control block 285 in step S2 to read edit lists one by one from the optical disc 12 and searches for any edit lists that reference destructively edited clips. Then, the reference edit list search block 272 supplies a result of the search to the control block 261. The control block 261 determines on the basis of the received search result whether there is any edit list referencing the destructively edited clip in step S3.

If referencing edit lists are found, the control block 261 selects an edit list to be updated in step S4 on the basis of the search result. In step S5, the edit list update block 273 controls the write control block 283, the read control block 284, and the edit update processing control block 285 to execute edit list update processing so as to update the edit list specified by the control block 261 such that the edit list is matched to a result of clip destructive edit processing. When the edit list update processing ends, the control block 261 determines on the basis of the update result and the search result whether there is any unprocessed edit lists to be updated, in step S6.

If an unprocessed edit list is found, the control block 261 returns the procedure to step S4 to repeat the above-mentioned processing therefrom. Namely, the control block 261 causes the edit list update block 273 to execute the edit list update processing (step S5) on all edit list to be updated. Then, if no unprocessed edit list to be updated is found in step S6 (namely, all edit list to be updated have been updated), the control block 261 carries the procedure to step S7.

If no edit list referencing a clip destructively edited on the basis of the search result supplied from the reference edit list search block 272 is found in step S3, then the control block 261 skips steps S4 through S6, carrying the procedure to step S7.

In step S7, the index file update block 274 controls the read control block 284 to read an index file from the optical disc 12. The index file update block 274 that has read the index file controls the edit update processing control block 285 to update the read index file such that the index file matches the clip destructive editing in step S8.

For example, when an image data file is updated, its UMID is also updated, so that the index file update block 274 updates the value of the UMID of the image data file included in the index file. If the file name, frame rate, or format of the image data file has been changed by this destructive editing, the index file update block 274 also updates the information associated with the image data file included in the index file.

Normally, a clip information file is also updated by this destructive editing, so that the UMID of the clip information file is also updated. Consequently, the index file update block 274 also updates the UMID of the clip information file included in the index file to a new UMID. At this moment, if the file name for example of the clip information file has changed, the index file update block 274 also updates the changed information included in the index file.

Further, if an audio data file has also be destructively edited along with an image data file, then the UMID of the audio file of each channel is also updated. Therefore, in such a case, the index file update block 274 updates the UMID of the audio data file included in the index file to a new UMID. If the file name for example of an audio data file has changed, the index file update block 274 also updates the changed information included in the index file. It should be noted that the index file update block 274 executes this update processing on all channels of the updated audio data, updating the information associated with the audio data file included in the index file. Further, the index file update block 274 executes the update processing on the proxy data file, the realtime metadata file, and nonrealtime metadata file in the same manner and updates the information associated with these files included in the index file as required.

It should be noted that, in the case of the destructive editing of a plurality of clips included in the index file, the index file update block 274 also executes the above-mentioned update processing for each of these clips, updating the information associated with each file included in each clip, as required.

As described above, the index file also includes the information about an edit list, in addition to clips. If the edit list has been updated by clip destructive editing, the index file update block 274 also reflects the updating of that edit list onto the index file. Namely, the index file update block 274 updates the information associated with the edit list included in the index file such that this information matches the updating of the edit list.

Thus, the index file update block 274 updates not only the UMID for example, such as the information about a destructively edited image data file of an index file, but also the information updated by that destructive editing.

Referring to FIG. 20 again, when the index file has been updated as described above in step S8, the index file update block 274 controls the write control block 283 to write the index file in step S9.

In step S10, the disc information file update block 275 controls the read control block 284 to read a disc information file from the optical disc 12. Having read the disc information file, the disc information file update block 275 controls the edit update processing control block 285 to update the read disc information file such that this file matches the clip destructive editing, in step S1.

When the disc information file has been destructively edited in step S11, the disc information file update block 275 controls the write control block 283 in step S12, writing the updated disc information file to the optical disc 12.

If mismatch information has been generated in the clip destruction edit processing in step S1 or in the edit list update processing in step S5, the mismatch processing block 276 controls the write control block 283 to write the generated mismatch information to the optical disc 12 in step S13. The mismatch processing block 276 also controls the edit update processing control block 285 in step S14 to get the generated mismatch information and supplies the obtained mismatch information to the control information output block 224 via the control block 261, thereby executing mismatch information output processing for outputting the mismatch information to the outside of the edit device 13.

When the mismatch information output processing has ended, the mismatch processing block 276 ends the destructive edit processing.

Figure 21:
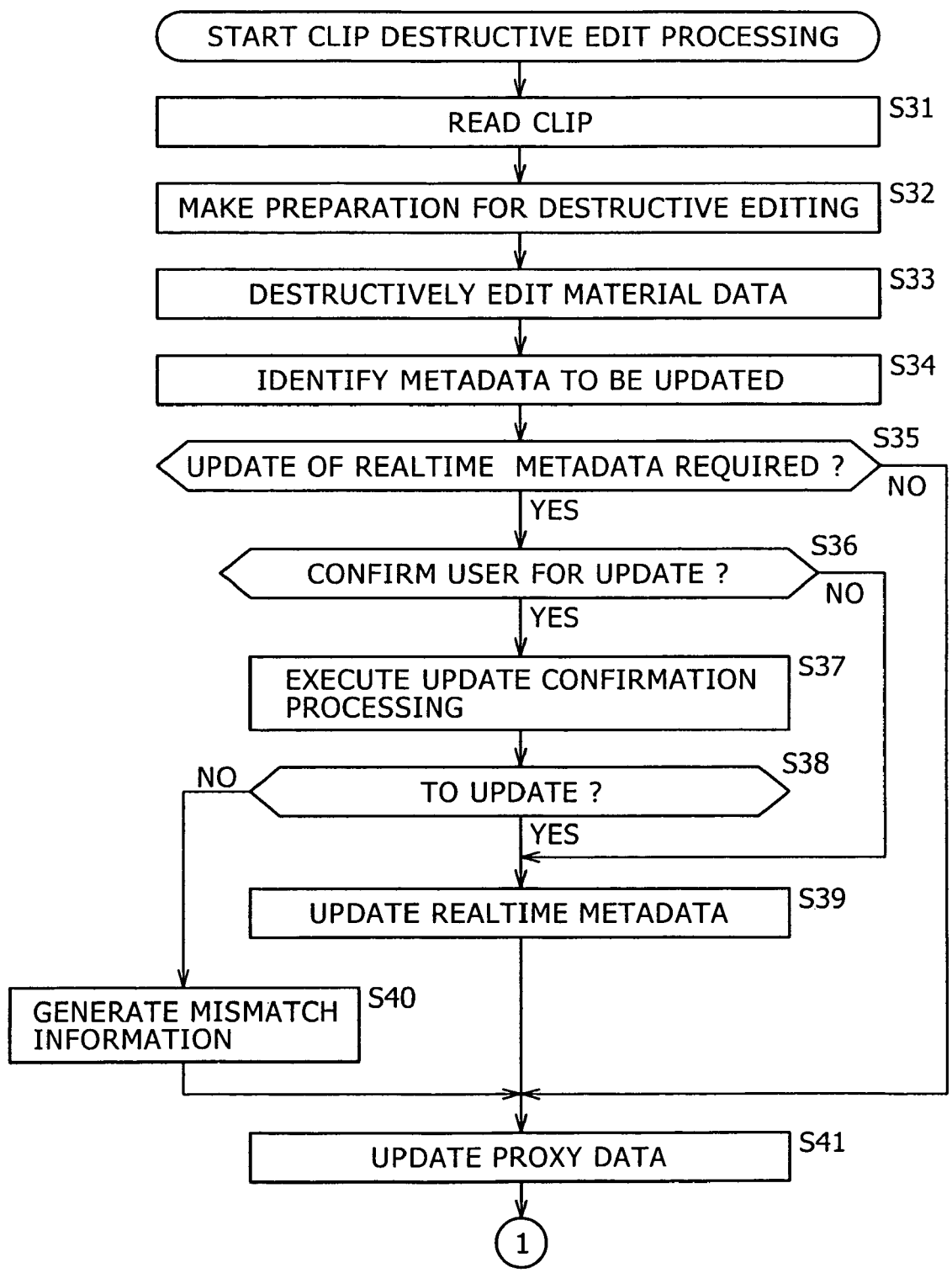
FIG. 21 is a flowchart indicative of an example of clip destructive edit processing.
Figure 22:
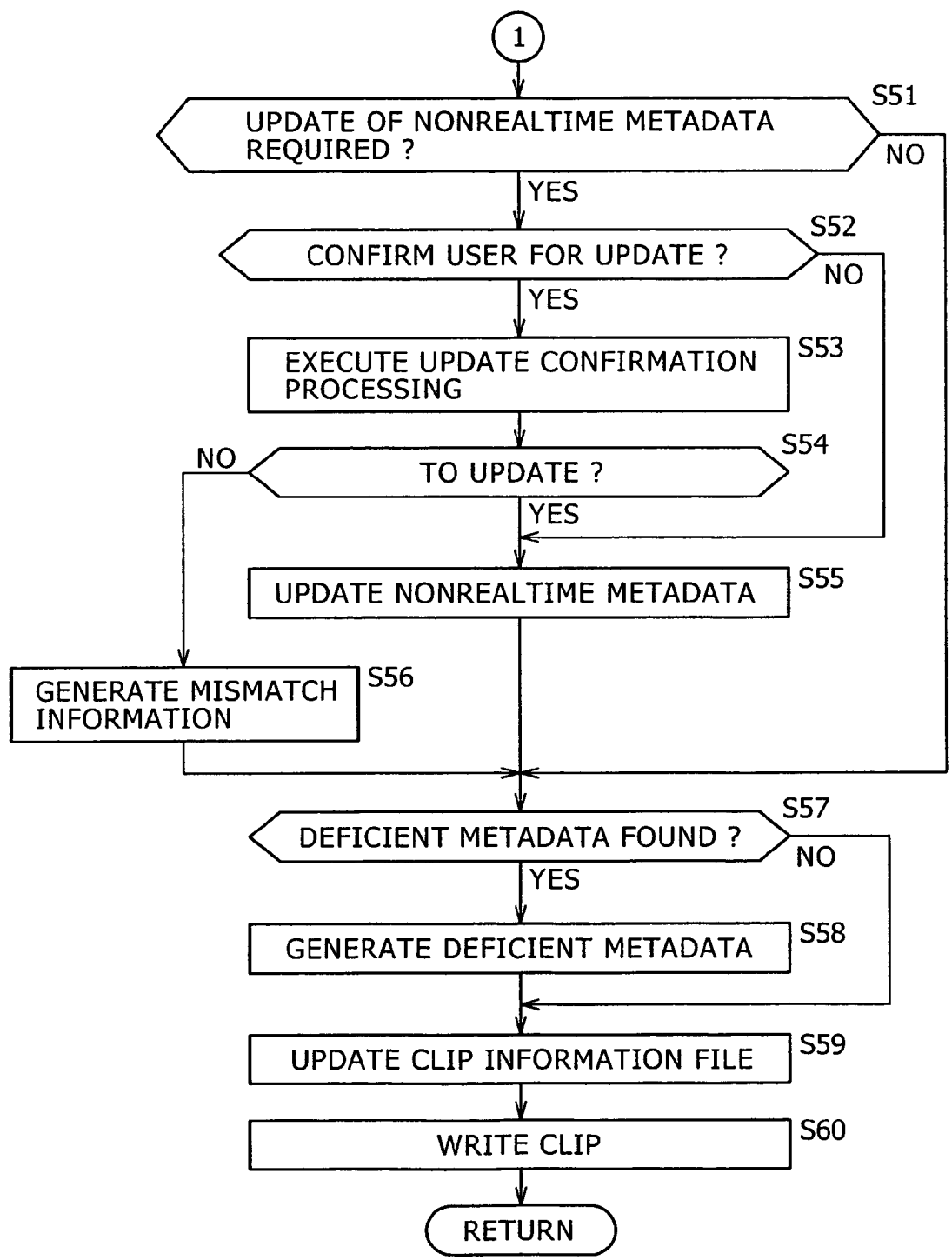
FIG. 22 is a flowchart continued from the flowchart shown in FIG. 21.

The following describes details of clip destructive edit processing to be executed in step S1 shown in FIG. 20 with reference to flowcharts shown in FIGS. 21 and 22.

First, in step S31 shown in FIG. 21, the clip read block 301 (FIG. 18) of the clip destructive edit block 271 controls read control block 284 to read a clip specified by the user from the optical disc 12 loaded on the drive. When the read clip is supplied to the information processing block 233 or the metadata processing block 235, the material data destructive edit processing block 302 makes preparations for destructive editing in step S32, thereby controlling the input control block 281 and the communication control block 282 to get new clip data for use in the destructive editing, for example.

When the preparations have been completed, the material data destructive edit processing block 302 controls the edit update processing control block 285 to destructively edit the material data such as image data and audio data in step S33. In doing so, the material data destructive edit processing block 302 updates not only the body itself of the material data configured as shown in FIG. 6, but also the header and the footer thereof as required.

When the destructive editing of the material data has been completed, the update metadata identification block 303 identifies the metadata to be updated along with the destructive editing of the material data and supplies a result of the identification to the realtime metadata update block 304 in step S34. In step S35, the realtime metadata update block 304 determines on the basis of the identification result whether the realtime metadata must be updated. If realtime metadata is specified as the metadata requiring updating and the updating of the realtime metadata is found required, then the realtime metadata update block 304 carries the procedure to step S36.

In step S36, the realtime metadata update block 304 determines whether to confirm the user for the updating of the realtime metadata. If the confirmation to the user is found necessary, the realtime metadata update block 304 carries the procedure to step S37. The update confirmation processing block 311 controls the operation input block 222 and the control information output block 224 via the control block 261, thereby executing updating confirmation processing. On the basis of a result of the confirmation, the realtime metadata update block 304 determines in step S38 whether to update the realtime metadata. If the realtime metadata is to be updated by the permission by the user for example, then the realtime metadata update block 304 carries the procedure to step S39, updating the information (body UMID, KLV packet, etc.) of the portion to be added to a frame corresponding to the updated portion of the material data, of the realtime metadata configured on a frame basis as shown in FIG. 7.

Having updated the realtime metadata, the realtime metadata update block 304 carries the procedure to step S41.

If the updating of realtime metadata is found not required in step S35, then the realtime metadata update block 304 carries the procedure to step S41 without updating the realtime metadata. If the user is not confirmed for updating in step S36, the update confirmation processing block 311 carries the procedure to step S39 without executing the update confirmation processing. If the updating of realtime metadata is found not required because the user does not allow it for example, the mismatch information generation block 312 generates mismatch information indicative of a mismatch between the material data and the realtime metadata. Having generated the mismatch information, the mismatch information generation block 312 carries the procedure to step S41.

In step S41, the proxy data update block 305 controls the edit update processing control block 285 to update the proxy data in accordance with the updating of the material data. When the proxy data has been updated, the proxy data update block 305 carries the procedure to step S51 shown in FIG. 22.

In step S51 shown in FIG. 22, the nonrealtime metadata update block 306 determines on the basis of the identification result obtained via the realtime metadata update block 304 whether it is necessary to update nonrealtime metadata. If nonrealtime metadata is specified as the metadata requiring updating in the identification result, namely, if the nonrealtime metadata is found requiring updating, then, the nonrealtime metadata update block 306 determines in step S52 whether a confirmation to the user for updating the nonrealtime metadata is to be made. If the confirmation to the user is to be made, then the nonrealtime metadata update block 306 carries the procedure to step S53. In step S53, the update confirmation processing block 311 controls the operation input block 222 and the control information output block 224 via the control block 261 to execute update confirmation processing. In step S54, the nonrealtime metadata update block 306 determines on the basis of a result of the confirmation whether to update the nonrealtime metadata. If the nonrealtime metadata is to be updated by the permission by the user for example, then the update confirmation processing block 311 carries the procedure to step S55 to update the nonrealtime metadata configured as described above.

For example, various tables associated with LTC change point, body UMID change point, and KLV packet or other information is updated in accordance with the destructive editing of material data.

Having updated the nonrealtime metadata, the nonrealtime metadata update block 306 carries the procedure to step S57.

If the updating of the nonrealtime metadata is found not required in step S51, then the nonrealtime metadata update block 306 carries the procedure to step S57 without updating the nonrealtime metadata. If the confirmation is not to be made to the user in step S52, then the update confirmation processing block 311 carries the procedure to step S55 without executing update confirmation processing. If the nonrealtime metadata is not to be updated because the user does not permit it for example in step S54, then the mismatch information generation block 312 generates mismatch information indicative of a mismatch between the material data and the nonrealtime metadata. Having generated the mismatch data, the mismatch information generation block 312 carries the procedure to step S57.

If the deficient metadata generation block 307 determines that there is any deficient data not yet generated in step S57, then the deficient metadata generation block 307 carries the procedure to step S58. In step S58, the deficient metadata generation block 307 generates the deficient metadata and carries the procedure to step S59. If no deficient metadata is found in step S57, then the deficient metadata generation block 307 carries the procedure to step S59 without executing the process of step S58.

In step S59, the clip information file update block 308 controls the edit update processing control block 285 to update a clip information file in accordance with the destructive editing of material data. When the updating has been completed, the clip write block 309 carries the procedure to step S60 and controls the write control block 283 to write each file of the updated clip to the optical disc 12. When the writing has been completed, the clip destructive edit block 271 ends the clip destructive edit processing and returns the procedure to step S1 shown in FIG. 1 to repeat the above-mentioned processing therefrom.

Figure 23:
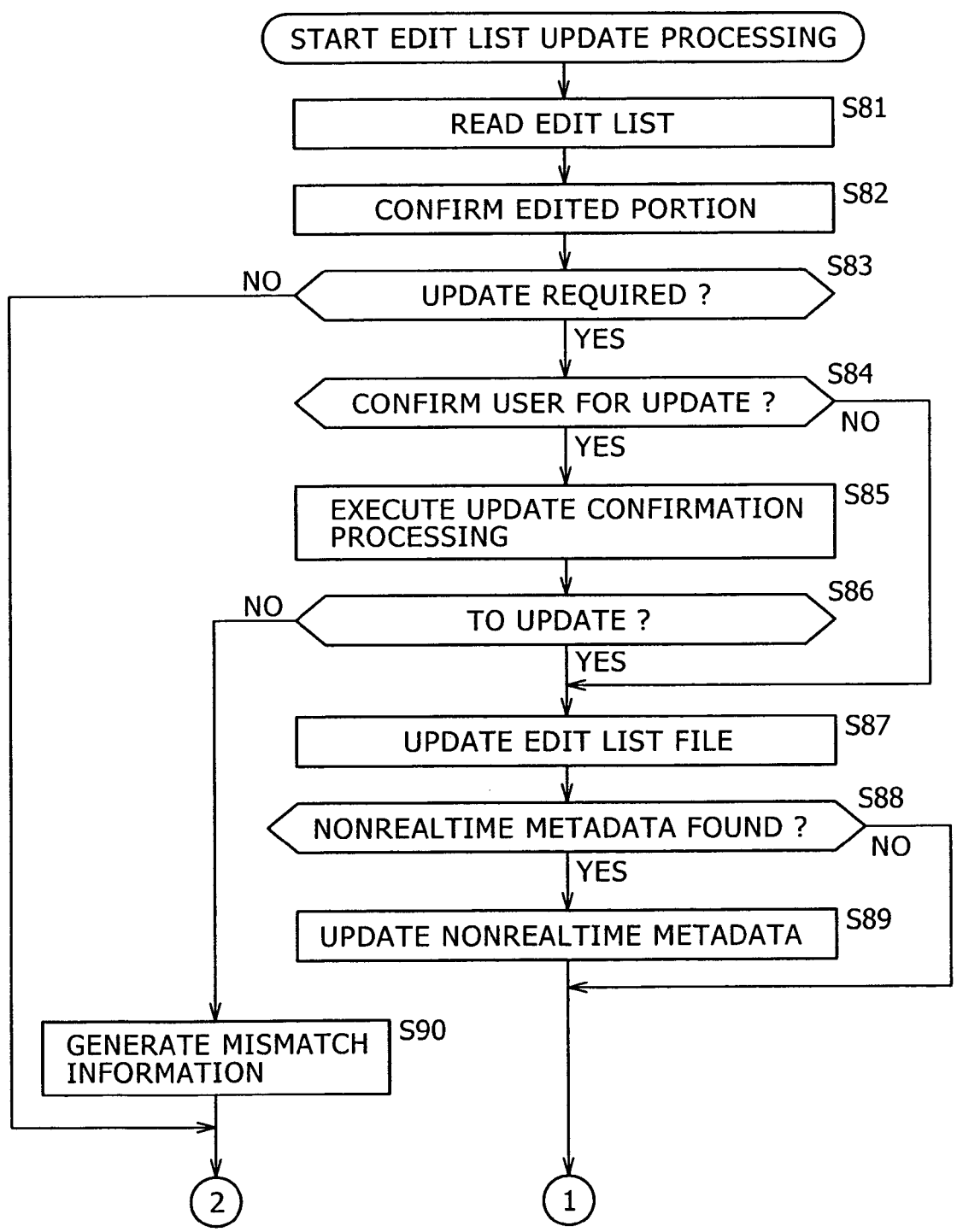
FIG. 23 is a flowchart indicative of an example of edit list update processing.
Figure 24:
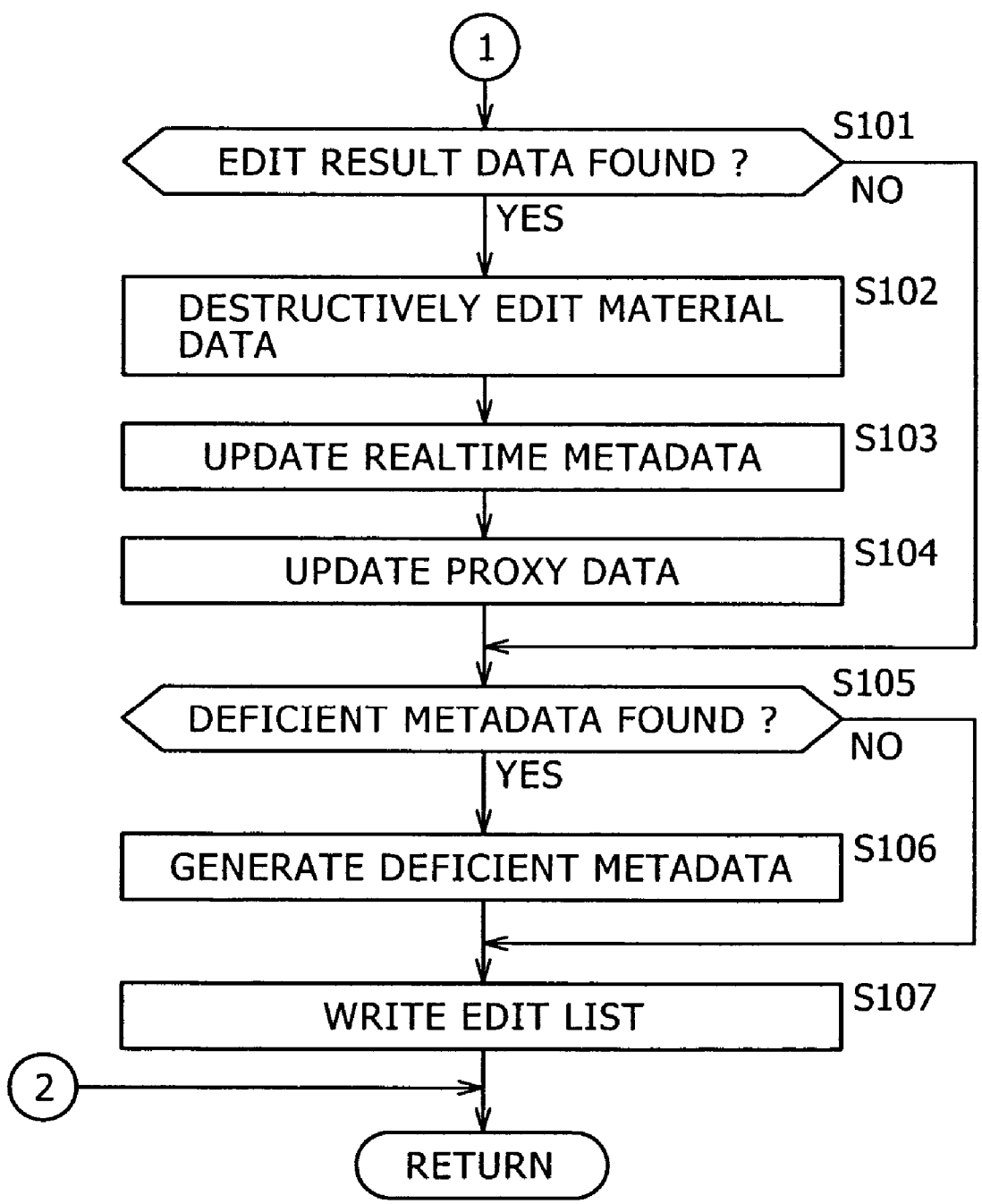
FIG. 24 is a flowchart continued from the flowchart shown in FIG. 23.

The following describes details of edit list update processing to be executed in step S5 shown in FIG. 20 with reference to flowcharts shown in FIGS. 23 and 24.

First, in step S81, the edit list read block 331 (FIG. 19) of the edit list update block 273 controls the read control block 284 to read an edit list specified by the control block 261 from the optical disc 12. When the read edit list has been supplied to the information processing block 233 or the metadata processing block 235, the edit portion confirmation block 332 confirms a clip edited portion in step S82.

For example, in the case of an edit list in which some frames are extracted from a clip, the destructive editing of unextracted frames will not affect the result of editing. Therefore, if, in a clip, the information (UMID and so on) for the entire clip or the entire file has not been changed and therefore the destructive editing of the clip will not affect the result of the editing for example, the edit list update block 273 does not update the edit list.

The edit list file update block 333 determines on the basis of the result of the confirmation provided by the edit portion confirmation block 332 whether the updating is required in step S83. If the updating is found required, then the edit list file update block 333 carries the procedure to step S84. In step S84, the update confirmation processing block 341 determines whether a confirmation to the user is to be made for the editing. If the confirmation is to be made, then the update confirmation processing block 341 controls the control information output block 224 and the operation input block 222 via the control block 261, thereby executing update confirmation processing in step S85.

In step S86, the edit list file update block 333 determines on the basis of the confirmation result provided by the update confirmation processing whether to update the edit list file. If the edit list file is to be updated, then the edit list file update block 333 carries the procedure to step S87 to update the edit list file. In step S88, the nonrealtime metadata update block 334 determines whether there is edit list nonrealtime metadata corresponding to the updated edit list file. If the edit list nonrealtime metadata is found, then the nonrealtime metadata update block 334 updates this nonrealtime metadata in step S89. Having updated the nonrealtime metadata, the nonrealtime metadata update block 334 carries the procedure to step S101 shown in FIG. 24.

If no edit list nonrealtime metadata corresponding to the updated edit list file is found in step S88 of FIG. 23, then the nonrealtime metadata update block 334 carries the procedure to step S101 in FIG. 24 without executing the process of step S89.

In step 101 of FIG. 24, the material data destructive edit block 335 determines whether there is any edit result data such as the material data indicative of an edit result corresponding to the edit list file. If the edit result data is found, then the material data destructive edit block 335 carries the procedure to step S102 to destructively edit the material data. In step S103, the realtime metadata update block 336 updates the realtime metadata. In step S104, the proxy data update block 337 updates the proxy data. Having updated the proxy data, the proxy data update block 337 carries the procedure to step S105. If no edit result data such as the material data indicative of the edit result corresponding to the edit list file is found in step S101, then the material data destructive edit block 335 carries the procedure to step S105 without executing the processes of steps S102 through S104.

If the deficient metadata generation block 338 determines in step S105 that there is deficient data not yet generated, then the deficient metadata generation block 338 carries the procedure to step S106 to generate the deficient data, carrying the procedure to step S107. If there is no deficient data in step S105, then the deficient metadata generation block 307 carries the procedure to step S107 without executing the process of step S106.

In step S107, the edit list write block 339 controls the write control block 283 to write the files of the updated edit list to the optical disc 12. When the writing has been completed, the edit list write block 339 ends the edit list update processing and returns the procedure to step S5 of FIG. 20 to repeat the above-mentioned processing therefrom.

It should be noted that, if the updating of the edit list is found not required in step S83 of FIG. 23, then the edit list file update block 333 ends the edit list update processing and returns the procedure to step S5 of FIG. 20 to repeat the above-mentioned processing therefrom.

If the updating of the edit list file is found not to be executed on the basis of the result of the update confirmation processing in step S86 of FIG. 23, then the edit list file update block 333 carries the procedure to step S90. In step S90, the mismatch information generation block 342 generates mismatch information and then ends the edit list update processing and returns the procedure to step S5 of FIG. 20 to repeat the above-mentioned processing therefrom.

Executing the destructive edit processing as described above allows the edit device 13 to also update the metadata of content data when the content data is destructively updated, thereby maintaining the integrity of each piece of data. This allows the user to easily execute the destructive editing of content data.

FIG. 25 shows an example of main metadata that is updated when audio data is inserted (or destructively edited) into a clip recorded to the optical disc 12.

In the table shown in FIG. 25, line 1 (No. 1) indicates that a value of an UMID attribute (umid) of a clip element (clip) in an clip table (clipTable) of an index file (INDEX) is updated by copying it by referencing an UMID (No. 6) of a clip information file.

Line 2 (No. 2) indicates that a value of an UMID attribute (umid) of an audio element (audio) in the clip table (clipTable) of the index file (INDEX) is updated by referencing and copying the UMID (AUDIO MXF MP UMID) (No. 14) of an audio data file.

Line 3 (No. 3) indicates that a value of an UMID attribute (umid) of a sub stream element (subStream) in the clip table (clipTable) of the index file (INDEX) is updated by referencing and copying the UMID (PROSY MXF MP UMID) (No. 17) of a proxy data file.

Line 4 (No. 4) indicates that a value of an ID attribute (clipid) of a history element (sequential.history.discinfo) of a disc information file (DISCINFO) is updated by storing reproduction position (only in the case of tape-like reproduction).

Line 5 (No. 5) indicates that a value of a FTC attribute (ftc) of the history element (sequential.history.discinfo) of the disc information file (DISCINFO) is updated by storing reproduction position (only in the case of tape-like reproduction).

Line 6 (No. 6) indicates that a value of an UMID attribute (umid) of a smile element (smil) of the clip information file (CLIPINFO) is updated by newly creating it.

Line 7 (No. 7) indicates that a value of a src attribute (or UMID included therein) of the audio element (audio) of the clip information file (CLIPINFO) is updated by referencing and copying an UMID (AUDIO MXF MP UMID) (No. 14) of the audio data file.

Line 8 (No. 8) indicates that a value of a src attribute (or UMID included therein) of a ref element (ref) of the clip information file (CLIPINFO) is updated by referencing and copying an UMID (PROXY MXF MP UMID) (No. 17) of the proxy data file.

Line 9 (No. 9) indicates that a value of an UMID attribute (umidref) of a target material element (TargetMaterial) of a nonrealtime metadata file (NRT) is updated by referencing and copying an UMID (No. 6) of the clip information file.

Line 10 (No. 10) indicates that a value of a value attribute of a last update element (LastUpdate) of the nonrealtime metadata file (NRT) is updated by setting the value of a value attribute as an essence update date (namely, a date on which audio data was inserted).

Line 11 (No. 11) indicates that a value of a last update attribute (lastupdate) (update date of nonrealtime metadata file itself) of a nonrealtime meta element (NonRealTimeMeta) of the nonrealtime metadata file (NRT) is updated by a value in the proximity of the value of No. 10.

The value of No. 10 is indicative of a time at which content was actually inserted. The value of No. 11 is indicative of a time at which nonrealtime metadata file (NRT) was updated. Preferably, these values become the same; actually, however, a difference often occurs in between due to the system processing. However, this time difference is very small, so that the value of No. 11 is updated to value nearly matching the value of No. 10 (namely, in the proximity of the value of No. 10).

Line 12 (No. 12) indicates that a value of an UMID attribute of the target material element (TargetMaterial.FragmentUpdatePayLoad.HeaderFuu) of the realtime metadata file (RT) is updated by referencing and copying the UMID (No. 6) of the clip information file.

Line 13 (No. 13) indicates that a value of a last modified date attribute (LastModifiedDate) (MXF file update date) of a preface element (PrefaceSet) of header metadata (HeaderMetadata) of the audio data file (AUDIO) is updated by approximating the value to a date at which the audio data was inserted by the same reason as with above-mentioned No. 11.

Line 14 (No. 14) indicates that a value of a package UID attribute (PackageUID) of the material package element (MaterialPackageSet) of the audio data file (AUDIO) is updated by generating the value in the same manner as with new clip generation on the basis of the UMID (No. 6) of the clip information file.

Line 15 (No. 15) indicates that a value of a package modified date (PackageModifiedDate) of the material package element (MaterialPackageSet) of the audio data file (AUDIO) is updated by approximating by the value approximating the value of No. 10 by the same reason as with above-mentioned No. 11.

Line 16 (No. 16) indicates that a value of a last modified date attribute (LastModifiedDate) (MXF file update date) of a preface element (PrefaceSet) of the header metadata (HeaderMetadata) of the proxy data file (PROXY) is updated by approximating this value to the date at which audio data was inserted by the same reason as with above-mentioned No. 11.

Further, Line 17 (No. 17) indicates that a value of a packet UID attribute (PackageUID) of the material package element (MaterialPackageSet) of the proxy data file (PROXY) is updated by generating the value in the same manner as with new clip generation on the basis of the UMID (No. 6) of the clip information file.

Line 18 (No. 18) indicates that the value of package modified date attribute (PackageModifiedDate) of material package element (MaterialPackageSet) of proxy data file (PROXY) is updated by the value approximating to the value of No. 10 by the same reason as with above-mentioned No. 11.

As described above, each component of the edit device 13 updates each type of metadata corresponding to the destructively edited material data such that the metadata are matched with each other. Consequently, the user is able to easily execute the destructive editing of content data. This also guarantees the operations of devices and applications based on metadata.

The above-mentioned sequence of processing operations may be executed by software as well as hardware. In this case, for example, the edit device 13 shown in FIG. 1 may be configured as a personal computer as shown in FIG. 26.

Referring to FIG. 26, a CPU (Central Processing Unit) 401 of a personal computer 400 executes various types of processing operations as instructed by programs stored in a ROM (Read Only Memory) 402 or programs loaded from a storage block 413 into a RAM (Random Access Memory) 403. The RAM 403 also stores data necessary for the execution by the CPU 401, from time to time.

The CPU 401, the ROM 402, the RAM 403 and the bus 404 are interconnected by a bus 404. This bus 404 is also connected to an input/output interface 410.

The input/output interface 410 is connected with an input block 411 based on keyboard and mouse for example, an output block 412 based on display such as CRT or LCD and speaker for example, a storage block 413 based on hard disc for example, and a communication block 414 based on modem for example. The communication block 414 executes communication processing via a network such as the Internet for example.

The input/output interface 410 is also connected with a drive 415 as required, on which a removable medium 421 such as magnetic disc, optical disc, magneto-optical disc, or semiconductor memory is loaded as required, computer programs read from the loaded removal medium being installed into the storage block 413 as required.

To execute the above-mentioned sequence of processing operations by means of software, programs constituting this software are installed from a network or a recording medium into the computer.

As shown in FIG. 26, these recording media are constituted by not only the removable media 421 made up of a magnetic disc (including flexible discs), an optical disc (including CD-ROM (Compact Disc Read Only Memory) and a DVD (Digital Versatile Disc)), the magneto-optical disc (including MD (Mini Disc) (trademark)), or the semiconductor memory which is distributed separately from the apparatus itself, but also the ROM 402 or the storage block 413 which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for processing material data forming content and content data formed by metadata to be attached to said material data, said apparatus including a computer, a processor, and a memory, comprising:
   material data destructive editing means for executing destructive editing in which data is actually updated for said material data;
   metadata identifying means for identifying metadata that is affected by the destructive editing of said material data by said material data destructive editing means; and
   metadata updating means for updating said metadata identified by said metadata identifying means, said metadata updating means comprising:
   realtime metadata updating means for updating realtime metadata requiring realtime nature in reproducing said realtime metadata at the time of reproducing said material data, said realtime metadata to be added to said material data, and
   nonrealtime metadata updating means for updating nonrealtime metadata requiring no realtime nature in reproduction of said nonrealtime metadata at the time of reproduction of said material data, said nonrealtime metadata to be added to said material data,
   wherein said material data destructive editing means destructively edits said material data and updates identification information to be attached to said material data,
   said metadata identifying means identifies metadata having identification information for identifying metadata to be destructively edited by said material data destructive editing means, and
      said metadata updating means updates said identification information for identifying said material data to be destructively edited included in said metadata identified by said metadata identifying means to said identification information updated by said material data destructive editing means.

2. The information processing apparatus according to claim 1, further comprising:
   content data reading means for reading said content data from a recording medium; and
   content data writing means for writing said content data to said recording medium,
   wherein said material data destructive editing means destructively edits material data of content data read from said recording medium by said content data reading means, and
   said content data writing means writes said material data destructively edited by said material data destructive editing means and said content data including said metadata updated by said metadata updating means to said recording medium.

3. The information processing apparatus according to claim 1, further comprising:
   proxy data updating means for updating proxy data that is a low-resolution data of said material data, along with the destructive editing by said material data destructive editing means.

4. The information processing apparatus according to claim 1, further comprising:
   management information updating means for updating management information for managing each piece of data included in said content data, along with the destructive editing by said material data destructive editing means.

5. The information processing apparatus according to claim 1, further comprising:
   update confirming means for confirming a user whether to execute updating of said metadata by said metadata updating means,
   wherein, only when said user allows the updating, said metadata updating means updates said metadata.

6. The information processing apparatus according to claim 5, further comprising:
   mismatch information generating means for generating mismatch information indicative of a mismatch between said material data destructively edited and said metadata corresponding to said material data if said user does not allow the updating of said metadata as confirmed by said update confirming means.

7. An information processing method for an information processing apparatus for processing material data forming content and content data formed by metadata to be attached to said material data, said apparatus including a computer, a processor, and a memory, comprising the steps of:
   executing destructive editing in which data is actually updated for said material data;
   identifying metadata that is affected by the destructive editing of said material data by said material data destructive editing step;
   updating said metadata identified by said metadata identifying step;
   destructively editing said material data;
   updating identification information to be attached to said material data;
   identifying metadata having identification information for identifying metadata to be destructively edited; and
   said metadata updating step updating said identification information for identifying said material data to be destructively edited, updating realtime metadata requiring realtime nature in reproducing said realtime metadata at the time of reproducing said material data, said realtime metadata to be added to said material data, and updating nonrealtime metadata requiring no realtime nature in reproduction of said nonrealtime metadata at the time of reproduction of said material data, said nonrealtime metadata to be added to said material data.

8. A computer-readable medium storing a program that when executed by a computer including a processor and a memory, processes material data forming content and content data formed by metadata added to said material data, said program comprising the steps of:
   executing destructive editing in which data is actually updated for said material data;
   identifying metadata that is affected by the destructive editing of said material data by said material data destructive editing step;
   updating said metadata identified by said metadata identifying step;
   destructively editing said material data;

updating identification information to be attached to said material data;

identifying metadata having identification information for identifying metadata to be destructively edited; and said metadata updating step updating said identification information for identifying said material data to be destructively edited, updating realtime metadata requiring realtime nature in reproducing said realtime metadata at the time of reproducing said material data, said realtime metadata to be added to said material data, and updating nonrealtime metadata requiring no realtime nature in reproduction of said nonrealtime metadata at the time of reproduction of said material data, said nonrealtime metadata to be added to said material data.

* * * * *